(12) United States Patent
Wakui et al.

(10) Patent No.: US 11,532,821 B2
(45) Date of Patent: Dec. 20, 2022

(54) NEGATIVE ELECTRODE FOR LITHIUM ION SECONDARY BATTERY, LITHIUM ION SECONDARY BATTERY, BATTERY PACK, ELECTRIC VEHICLE, POWER STORAGE SYSTEM, POWER TOOL, AND ELECTRONIC DEVICE

(71) Applicant: MURATA MANUFACTURING CO., LTD., Kyoto (JP)

(72) Inventors: Yoshinori Wakui, Kyoto (JP); Koji Morita, Kyoto (JP); Hirotaka Fukudome, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 147 days.

(21) Appl. No.: 16/354,871

(22) Filed: Mar. 15, 2019

(65) Prior Publication Data
US 2019/0214649 A1  Jul. 11, 2019

Related U.S. Application Data

(63) Continuation of application No. PCT/JP2017/025567, filed on Jul. 13, 2017.

(30) Foreign Application Priority Data

Sep. 16, 2016  (JP) .............................. JP2016-181632
Mar. 15, 2017  (JP) .............................. JP2017-050045

(51) Int. Cl.
*H01M 4/66* (2006.01)
*H01M 4/134* (2010.01)
(Continued)

(52) U.S. Cl.
CPC ........... *H01M 4/661* (2013.01); *H01M 4/133* (2013.01); *H01M 4/134* (2013.01); *H01M 4/64* (2013.01);
(Continued)

(58) Field of Classification Search
None
See application file for complete search history.

(56) References Cited

U.S. PATENT DOCUMENTS

| 2004/0258991 | A1* | 12/2004 | Choi ..................... H01M 4/621 429/217 |
| 2016/0141626 | A1 | 5/2016 | Hosaka et al. |
| 2017/0149057 | A1 | 5/2017 | Sugita et al. |

FOREIGN PATENT DOCUMENTS

| JP | 2016-024934 | 2/2016 |
| JP | 2016154080 A | 8/2016 |

(Continued)

OTHER PUBLICATIONS

Machine Translation of JP 2016-154080 A (Year: 2016).*

(Continued)

*Primary Examiner* — Robert S Carrico
(74) *Attorney, Agent, or Firm* — K&L Gates LLP

(57) ABSTRACT

A lithium ion secondary battery includes a positive electrode, a negative electrode, and an electrolyte. The negative electrode has a negative electrode current collector and a negative electrode active material layer provided on the negative electrode current collector. The negative electrode current collector satisfies:

$(D2/D1) \geq 0.968$  (1), $D2 \geq 21.947*(X/100)-24.643$  (2), $110 \leq X \leq 125$  (3), and where D1 is a first displacement amount in a first piercing test at a first piercing speed of 0.1 mm/min or more; D2 is a second displacement amount in a second piercing test at a second piercing speed of less than 0.1 mm/min; and X is an expansion coefficient (%) of the negative electrode active material layer.

11 Claims, 9 Drawing Sheets

(51) Int. Cl.
- *H01M 4/64* (2006.01)
- *H01M 4/133* (2010.01)
- *H01M 10/0525* (2010.01)
- *H01M 4/02* (2006.01)

(52) U.S. Cl.
CPC ............ *H01M 4/66* (2013.01); *H01M 4/662* (2013.01); *H01M 10/0525* (2013.01); *H01M 2004/027* (2013.01); *Y02E 60/10* (2013.01); *Y02T 10/70* (2013.01)

(56) References Cited

FOREIGN PATENT DOCUMENTS

| | | |
|---|---|---|
| WO | 2014200003 A1 | 12/2014 |
| WO | 2016009794 A1 | 3/2016 |

OTHER PUBLICATIONS

International Search Report for Application No. PCT/JP2017/025567, dated Aug. 8, 2017.
European Search Report dated May 19, 2020 in corresponding European Application No. 17850534.3.
Korean Office Action dated Jun. 17, 2020 in corresponding Korean Application No. 10-2019-7006778.
Chinese Office Action dated Jul. 2, 2021 in corresponding Chinese Application No. 201780054675.6.
Chinese Office Action dated Dec. 2, 2021 in corresponding Chinese Application No. 201780054675.6.

* cited by examiner

NEGATIVE ELECTRODE FOR LITHIUM ION SECONDARY BATTERY, LITHIUM ION SECONDARY BATTERY, BATTERY PACK, ELECTRIC VEHICLE, POWER STORAGE SYSTEM, POWER TOOL, AND ELECTRONIC DEVICE

CROSS REFERENCE TO RELATED APPLICATIONS

The present application is a continuation of PCT patent application no. PCT/JP2017/025567, filed on Jul. 13, 2017, which claims priority to Japanese patent application no. JP2016-181632 filed on Sep. 16, 2016, and JP2017-050045 filed on Mar. 15, 2017, the entire contents of which are being incorporated herein by reference.

BACKGROUND

The present technology generally relates to a negative electrode for a lithium ion secondary battery, a lithium ion secondary battery, a battery pack, an electric vehicle, a power storage system, a power tool, and an electronic device including the negative electrode.

Various types of electronic devices such as mobile phones and personal digital assistants (PDAs) have come into widespread use and there is a demand for further miniaturization, weight reduction, and longer lifespans for these electronic devices. Along with this, development of a battery as a power source, particularly a secondary battery which is small and light and able to obtain a high energy density, is under way.

The application of secondary batteries in other types of uses has also been considered without being limited to the electronic devices described above. Examples of the other uses include battery packs which are attachably and detachably mounted on an electronic device or the like, electric vehicles such as an electric automobile, power storage systems such as a power server for home use, and power tools such as a power drill.

SUMMARY

There is a need for electronic devices with miniaturization, weight reduction, and higher energy density.

Therefore, it is desirable to provide a lithium ion secondary battery, a battery pack, an electric vehicle, a power storage system, a power tool, and an electronic device which are small and light and are able to obtain excellent battery characteristics, and a negative electrode for a lithium ion secondary battery suitable for them.

According to an embodiment of the present disclosure, a negative electrode for a lithium ion secondary battery is provided. The negative electrode includes a negative electrode current collector and a negative electrode active material layer provided on the negative electrode current collector. The negative electrode current collector satisfies all conditional formulas (1) to (3):

$$(D2/D1) \geq 0.968 \quad (1)$$

$$D2 \leq 21.947 * (X/100) - 24.643 \quad (2)$$

$$110 \leq X \leq 125 \quad (3)$$

where $D1$ is a first displacement amount in a first piercing test at a first piercing speed of 0.1 mm/min or more; $D2$ is a second displacement amount in a second piercing test at a second piercing speed of less than 0.1 mm/min; and $X$ is an expansion coefficient (%) of the negative electrode active material layer, and same conditions are used in the first and second piercing tests except piercing speed.

According to an embodiment of the present disclosure, a lithium ion secondary battery, battery pack, electric vehicle, power storage system, power tool, and electronic device (hereinafter referred to as lithium ion secondary battery and the like) each include a negative electrode for a lithium ion secondary battery in accordance with an embodiment of the present disclosure as described herein.

Since the negative electrode for a lithium ion secondary battery in accordance with an embodiment of the present disclosure includes the above-mentioned configuration, for example, even in the case where expansion and shrinkage of the negative electrode active material occur, the negative electrode current collector is less likely to be broken.

The lithium ion secondary battery and the like in accordance with an embodiment of the present disclosure are made smaller and lighter by reducing the thickness of the negative electrode current collector, and can obtain excellent battery characteristics. Further, the negative electrode for the lithium ion secondary battery in accordance with an embodiment of the present disclosure can preferably be used for the above-mentioned lithium ion secondary battery and the like.

It should be understood that the advantageous effect of the present disclosure is not limited thereto and other suitable properties relating to the present technology may be realized and as further described.

DETAILED DESCRIPTION

The present technology generally relates to a negative electrode for a lithium ion secondary battery, a lithium ion secondary battery, a battery pack, an electric vehicle, a power storage system, a power tool, and an electronic device including the negative electrode.

As described herein, the present disclosure will be described based on examples with reference to the drawings, but the present disclosure is not to be considered limited to the examples, and various numerical values and materials in the examples are considered by way of example.

First, a secondary battery according to an embodiment of the present technology will described.

Figure 1:
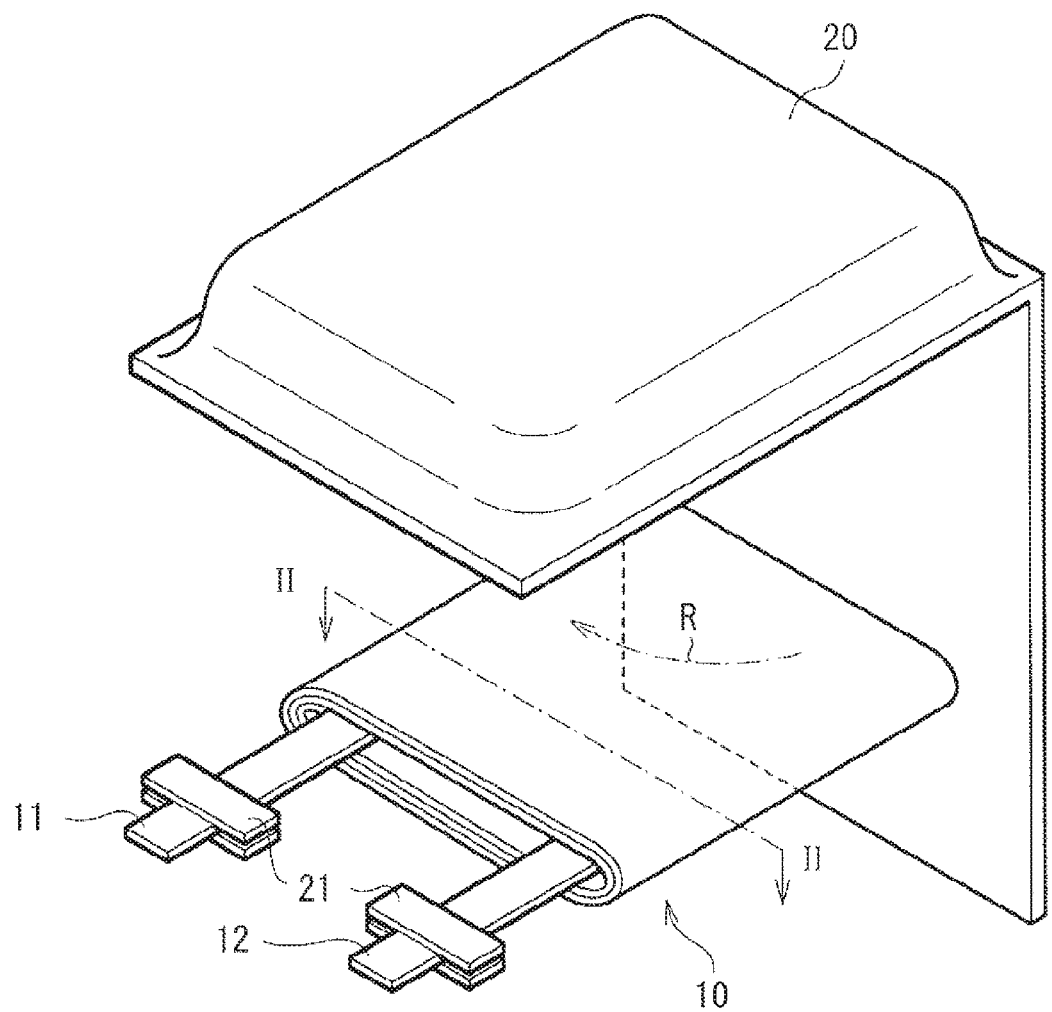
FIG. 1 is a perspective view showing the configuration of a (laminated film type) secondary battery according to an embodiment of the present technology.
Figure 2:
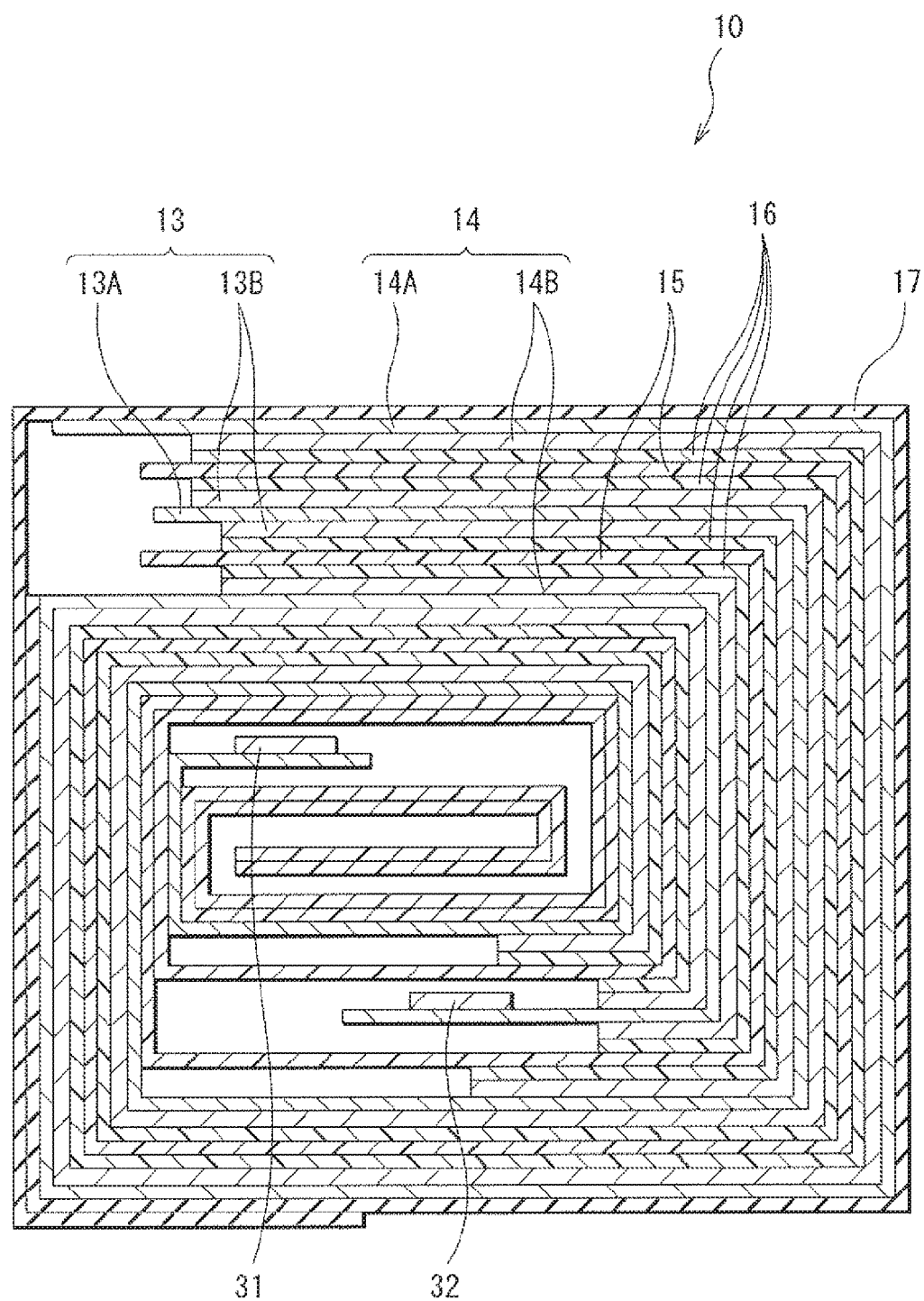
FIG. 2 is a sectional view of a wound electrode body taken along line shown in FIG. 1.

FIG. 1 shows a perspective configuration of a first secondary battery. FIG. 2 is a sectional configuration of a wound electrode body 10 taken along line II-II shown in FIG. 1.

The secondary battery described here is a secondary battery which is able to acquire a capacity of a negative electrode 14 due to the occlusion and release of an electrode reactant, and has a so-called laminated film type battery structure.

The "electrode reactant" refers to a substance that is involved in the electrode reaction, which is, for example, lithium (or lithium ion) in the lithium ion secondary battery that is able to acquire a battery capacity due to the occlusion and release of lithium (Li). A case where the secondary battery of the present technology is a lithium ion secondary battery will be exemplified below.

The secondary battery has a wound electrode body 10 of a battery device which is housed inside an exterior member 20 compose of a film, for example, as shown in FIG. 1. In the wound electrode body 10, for example, a positive electrode 13 and a negative electrode 14 are laminated with a separator 15 and an electrolyte layer 16 interposed therebetween, and the positive electrode 13 and the negative electrode 14 laminated with the separator 15 and the electrolyte layer 16 interposed therebetween are wound. A positive electrode lead 11 is attached to the positive electrode 13, and a negative electrode lead 12 is attached to the negative electrode 14. The outermost peripheral portion of the wound electrode body 10 is protected by a protective tape 17.

For example, the positive electrode lead 11 is led out from the inside of the exterior member 20 toward the outside. This positive electrode lead 11 includes, for example, any one or more kinds of conductive materials such as aluminum (Al). These conductive materials have the form of, for example, a thin plate or a net.

For example, the negative electrode lead 12 is led out from the inside of the exterior member 20 toward the outside in the same direction as the positive electrode lead 11. This negative electrode lead 12 includes, for example, any one or more kinds of conductive materials such as copper (Cu), nickel (Ni), and stainless steel. These conductive materials have the form of, for example, a thin plate or a net.

The exterior member 20 is, for example, a sheet of film that is foldable in a direction of an arrow R shown in FIG. 1, and a part of the exterior member 20 is provided with a recess for housing the wound electrode body 10. The exterior member 20 is, for example, a laminated film of a fusion layer, a metallic layer, and a surface protective layer laminated in this order. In a process of manufacturing the secondary battery, the exterior member 20 is folded so that the fusion layers are opposed to each other with the wound electrode body 10 interposed therebetween, and then outer peripheral edges of the fusion layers are fused to each other. However, the exterior member 20 may have two laminated films bonded to each other using an adhesive or the like. The fusion layer includes, for example, any one or more kinds of films such as polyethylene and polypropylene. The metallic layer includes, for example, any one or more kinds of metals such as aluminum foil. The surface protective layer includes, for example, any one or more kinds of films such as nylon and polyethylene terephthalate.

Above all, the exterior member 20 is preferably an aluminum laminated film in which the polyethylene film, aluminum foil, and nylon film are laminated in this order. However, the exterior member 20 may be a laminated film that has another multilayer structure, a polymer film such as polypropylene, or a metallic film.

An adhesive film 21 is inserted between the exterior member 20 and the positive electrode lead 11, for example, to prevent entry of outside air. In addition, for example, an adhesive film 21 is inserted between the exterior member 20 and the negative electrode lead 12. The adhesive film 21 includes any one or more kinds of materials having adhesion to both the positive electrode lead 11 and the negative electrode lead 12. The material having adhesion is, for example, a polyolefin resin and the like, and more specifically, the material is any one or more kinds of materials such as polyethylene, polypropylene, modified polyethylene, and modified polypropylene.

The positive electrode 13 includes, for example, a positive electrode current collector 13A and a positive electrode active material layer 13B provided on the positive electrode current collector 13A, as shown in FIG. 2.

The positive electrode active material layer 13B may be provided on one side of the positive electrode current collector 13A alone or on both sides thereof. FIG. 2 shows, for example, a case where the positive electrode active material layer 13B is provided on both sides of the positive electrode current collector 13A.

The positive electrode current collector 13A includes, for example, any one or more kinds of conductive materials. The kind of the conductive material is not particularly limited. The conductive material is, for example, a metallic material such as aluminum, nickel, and stainless steel, and may be an alloy containing two or more kinds of the metallic materials. The positive electrode current collector 13A may have a single layer or multiple layers.

The positive electrode active material layer 13B contains any one or more kinds of positive electrode materials that are able to occlude and release lithium as a positive electrode active material. However, the positive electrode active material layer 13B may further contain any one or more kinds of other materials such as a positive electrode binder and a positive electrode conducting agent.

The positive electrode material is preferably any one or more kinds of lithium-containing compounds. The kind of the lithium-containing compound is not particularly limited, and above all, a lithium-containing composite oxide and a lithium-containing phosphate compound are preferable. This is because a high energy density is obtained.

The "lithium-containing composite oxide" is an oxide containing lithium and any one or more kinds of elements other than lithium (hereinafter referred to as "other elements") as constituent elements. The lithium-containing oxide has, for example, any one or more kinds of crystal structures such as a layered rock-salt crystal structure and a spinel-type crystal structure.

The "lithium-containing phosphate compound" is a phosphate compound containing lithium and any one or more kinds of other elements as constituent elements. The lithium-containing phosphate compound has, for example, any one or more kinds of crystal structures such as an olivine-type crystal structure.

The kinds of other elements are not particularly limited as long as the elements are one or more kinds of any elements (except lithium). Above all, other elements are preferably any one or more kinds of elements that belong to Group 2 to Group 15 in the long period periodic table. More specifically, other elements are more preferably any one or more kinds of metal elements such as nickel, cobalt, manganese, and iron. This is because a high voltage is obtained.

Examples of the lithium-containing composite oxide having a layered rock salt crystal structure include compounds represented by the following formulas (1) to (3):

$$Li_aMn_{(1-b-c)}Ni_bM1_cO_{(2-d)}F_e \quad (1)$$

(M1 is at least one kind of cobalt, magnesium, aluminum, boron, titanium, vanadium, chromium, iron, copper, zinc, zirconium, molybdenum, tin, calcium, strontium, and tungsten. a to e satisfy the following: $0.8 \le a \le 1.2$; $0 < b < 0.5$; $0 \le c \le 0.5$; $(b+c)<1$; $-0.1 \le d \le 0.2$; and $0 \le e \le 0.1$. However, the composition of lithium varies depending on the charge/discharge condition, and a refers to the value in a full discharge condition.)

$$Li_aNi_{(1-b)}M2_bO_{(2-c)}F_d \quad (2)$$

(M2 is at least one kind of cobalt, manganese, magnesium, aluminum, boron, titanium, vanadium, chromium, iron, copper, zinc, molybdenum, tin, calcium, strontium, and tungsten. a to d satisfy the following: $0.8 \le a \le 1.2$; $0.005 \le b \le 0.5$; $-0.1 \le c \le 0.2$; and $0 \le d \le 0.1$. However, the composition of lithium varies depending on the charge/discharge condition, and a refers to the value in a full discharge condition.)

$$Li_aCo_{(1-b)}M3_bO_{(2-c)}F_d \quad (3)$$

(M3 is at least one kind of nickel, manganese, magnesium, aluminum, boron, titanium, vanadium, chromium, iron, copper, zinc, molybdenum, tin, calcium, strontium, and tungsten. a to d satisfy the following: $0.8 \le a \le 1.2$; $0 \le b \le 0.5$; $-0.1 \le c \le 0.2$; and $0 \le d \le 0.1$. However, the composition of lithium varies depending on the charge/discharge condition, and a refers to the value in a full discharge condition.)

Examples of the lithium-containing composite oxide having a layered rock salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

In the case where the lithium-containing composite oxide having a layered rock salt crystal structure contains nickel, cobalt, manganese, and aluminum as constituent elements, the atomic fraction of the nickel is preferably 50 atomic % or more. This is because a high energy density is obtained.

Examples of the lithium-containing composite oxide having a spinel-type crystal structure include compounds represented by the following formula (4):

$$Li_aMn_{(2-b)}M4_bO_cF_d \quad (4)$$

(M4 is at least one kind of cobalt, nickel, magnesium, aluminum, boron, titanium, vanadium, chromium, iron, copper, zinc, molybdenum, tin, calcium, strontium, and tungsten. a to d satisfy the following: $0.9 \le a \le 1.1$; $0 \le b \le 0.6$; $3.7 \le c \le 4.1$; and $0 \le d \le 0.1$. However, the composition of lithium varies depending on the charge/discharge condition, and a refers to the value in a full discharge condition.)

Examples of the lithium-containing composite oxide having a spinel-type crystal structure include $LiMn_2O_4$.

Examples of the lithium-containing phosphate compound having an olivine-type crystal structure include compounds represented by the following formula (5):

$$Li_aM5O_4 \quad (5)$$

(M5 is at least one kind of cobalt, manganese, iron, nickel, magnesium, aluminum, boron, titanium, vanadium, niobium, copper, zinc, molybdenum, calcium, strontium, tungsten, and zirconium. a satisfies the following: $0.9 \le a \le 1.1$. However, the composition of lithium varies depending on the charge/discharge condition, and a refers to the value in a full discharge condition.)

Examples of the lithium-containing phosphate compound having an olivine-type crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be a compound represented by the following formula (6):

$$(Li_2MnO_3)_x(LiMnO_2)_{1-x} \quad (6)$$

(x satisfies the following: $0 \le x \le 1$.)

In addition to this, the positive electrode material may be, for example, an oxide, a disulfide, a chalcogenide, and a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

However, the positive electrode material s not limited to the above materials, and may be other materials.

The positive electrode binder includes, for example, any one or more kinds of a synthetic rubber, a polymer compound, and any other materials. Examples of the synthetic rubber include a styrene butadiene rubber, a fluorine-based rubber, and ethylene propylene diene. Examples of the polymer compound include polyvinylidene fluoride, polyacrylic acid, polyimide, polyamide, polyamide imide, polytetrafluoroethylene, polyacrylonitrile, and carboxymethyl cellulose.

The positive electrode conducting agent includes, for example, any one or more kinds of carbon materials. Examples of the carbon material include graphite, carbon black, acetylene black, and Ketjen black. The positive electrode conducting agent may be a metallic material, a conductive polymer, or the like as long as this material has conductivity.

The negative electrode 14 includes, for example, a negative electrode current collector 14A and a negative electrode active material layer 14B provided on the negative electrode current collector 14A, as shown in FIG. 2.

The negative electrode active material layer 14B may be provided on one side of the negative electrode current collector 14A alone or on both sides thereof. FIG. 2 shows, for example, a case where the negative electrode active material layer 14B is provided on both sides of the negative electrode current collector 14A.

The negative electrode current collector 14A includes, for example, any one or more kinds of conductive materials. The kind of the conductive material is not particularly limited. The conductive material is, for example, a metallic material such as copper, aluminum, nickel, and stainless steel, and may be an alloy containing two or more kinds of the metallic materials. The negative electrode current collector 14A may be particularly a copper alloy foil containing copper as its main component. The negative electrode current collector 14A may have a single layer or multiple layers.

It is preferable that a surface of the negative electrode current collector 14A be roughened. This is because the adhesion of the negative electrode active material layer 14B to the negative electrode current collector 14A is improved through a so-called anchor effect. In this case, in a region opposite to at least the negative electrode active material layer 14B, the surface of the negative electrode current collector 14A may be roughened. As the roughening method, for example, a method of forming particulates through an electrolytic treatment, and the like may be exemplified. In the electrolytic treatment, particulates are formed on the negative electrode current collector 14A in an electrolytic bath through an electrolytic method, so that concavities and convexities are provided on the surface of the negative electrode current collector 14A. Copper foil formed through the electrolytic method is generally called electrolytic copper foil.

Figure 3A:
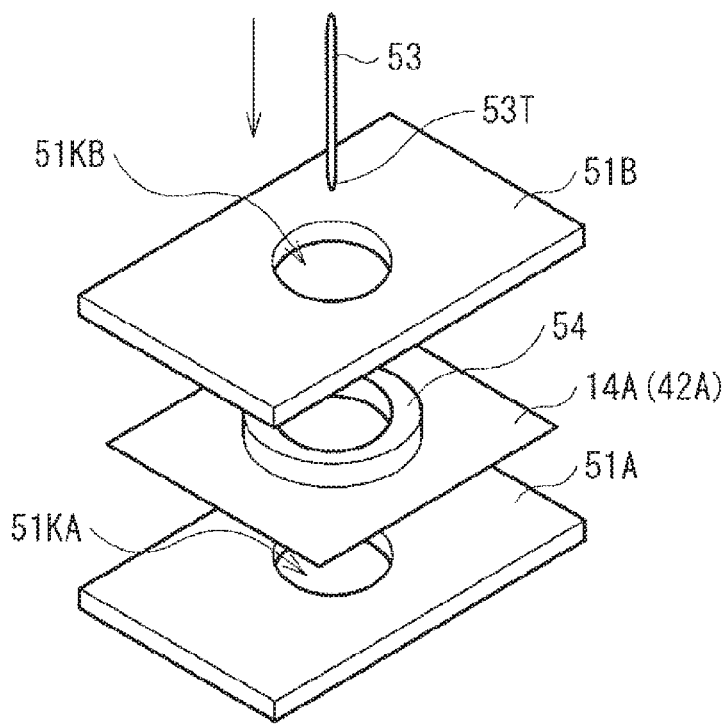
FIG. 3A is an exploded perspective view illustrating a procedure for evaluating a negative electrode current collector shown in FIG. 2 according to an embodiment of the present technology.

In the negative electrode current collector 14A, for example, a ratio of a displacement amount D2 in a piercing test at a piercing speed V2 of less than 0.1 mm/min with respect to a displacement amount D1 in a piercing test at a piercing speed V1 of 0.1 mm/min or more may be 0.968 or more (D2/D1≥0.968). The "piercing test" as used herein is a test to be conducted in the following manner. For example, as shown in FIG. 3A, in a sample of the negative electrode current collector 14A that is sandwiched between a pair of substrates 51A, 51B having openings 51KA, 51KB, a piercing jig 53 is brought closer to a portion where the openings 51KA and 51KB are overlapped at a constant piercing speed. The openings 51KA, 51KB have an inner diameter (diameter) of, for example, about 10.0 mmφ, and the piercing jig 53 has a diameter of about 2 mmφ. In the piercing test, a ring 54 made of rubber is inserted to a position where the openings 51KA and 51KB are overlapped, between the substrate 51B and the negative electrode current collector 14A. The ring 54 has substantially the same inner diameter (diameter) (about 10.0 mmφ) as the openings 51KA, 51KB, and has an outer diameter (diameter) of, for example, 13.0 mmφ. At this time, the piercing jig 53 is traveled in the direction of an arrow Y53 so as to be orthogonal to a surface 14SS of the sample of the negative electrode current collector 14A. After a tip end portion 53T of the piercing jig 53 is brought into contact with the surface 14SS (FIG. 3B), the piercing jig 53 is continuously traveled in the direction of the arrow Y53 at a constant piercing speed V until the sample of the negative electrode current collector 14A is broken (FIG. 3C). Thus, a displacement amount D of the tip end portion 53T in the direction of the arrow Y53 is determined from the time when the tip end portion 53T of the piercing jig 53 is brought into contact with the surface 14SS to the time when the sample of the negative electrode current collector 14A is broken. Therefore, the displacement amount D1 of this embodiment is the displacement amount D determined when the piercing speed V1 is set to 0.1 mm/min or more, and the displacement amount D2 of this embodiment is the displacement amount D determined when the piercing speed V2 is set to less than 0.1 mm/min. However, when the displacement amounts D1 and D2 are determined, the same conditions are used in the piercing test, for example, the thickness of the sample of the negative electrode current collector 14A, except the piercing speeds V1, V2. The displacement amount D2 may be 0.59 mm or more. Further, when the expansion coefficient of the negative electrode active material layer 14B is set to X (%), the negative electrode current collector 14A may satisfy the following conditional formulas (7) and (8):

$$D2 \geq 21.947*(X/100)-24.643 \quad (7)$$

$$110 \leq X \leq 125 \quad (8)$$

The negative electrode active material layer 14B contains any one or more kinds of negative electrode materials that are able to occlude and release lithium as a negative electrode active material. However, the negative electrode active material layer 14B may further contain any one or more kinds of other materials such as a negative electrode binder and a negative electrode conducting agent. Details of the negative electrode binder and the negative electrode conducting agent are the same as those of the positive electrode binder and the positive electrode conducting agent, for example.

It is preferable that a chargeable capacity of the negative electrode material be larger than a discharge capacity of the positive electrode 13 in order to prevent lithium metal from being unintentionally precipitated on the negative electrode 14 during charging. That is, the electrochemical equivalent of the negative electrode material that is able to occlude and release lithium is preferably larger than that of the positive electrode 13.

The negative electrode material is a carbon material and a silicon material. That is, the negative electrode active material layer 14B contains two kinds of negative electrode materials (carbon material and silicon material) together as negative electrode active materials. The "silicon material" refers to a generic term for materials containing silicon as a constituent element, and an elementary substance of silicon is also included in the silicon material. One alone or two or more of the carbon materials may be used. Similarly, one alone or two or more of the silicon materials may be used.

The carbon material is used as the negative electrode material because variation in a crystal structure during occlusion and release of lithium is very small, and therefore, it is possible to stably obtain a high energy density. In addition, this is because the carbon material also functions as the negative electrode conducting agent, and therefore, the conductivity of the negative electrode active material layer 14B improves.

The silicon material is used as the negative electrode material because silicon has an excellent capability of occluding and releasing of lithium, and therefore, it is possible to obtain a remarkably high energy density.

The carbon material and the silicon material are used in combination as the negative electrode material because it is possible to obtain a high theoretical capacity (in other words, battery capacity) while the expansion and shrinkage of the negative electrode active material layer 14B are suppressed during charging/discharging. Specifically, the silicon material advantageously has a high theoretical capacity, but is likely to cause severe expansion and shrinkage during charging/discharging. In contrast to this, the carbon material disadvantageously has a low theoretical capacity, but is less likely to cause expansion and shrinkage during charging/discharging. Therefore, the use of the carbon material in combination with the silicon material suppresses the expansion and shrinkage of the negative electrode active material layer 14B during charging/discharging and it is possible to obtain a high theoretical capacity.

Examples of the carbon material include easy-graphitization carbon, non-graphitization carbon, and graphite. However, a plane spacing of (002) plane in the non-graphitization carbon is preferably 0.37 nm or more, and a plane spacing of (002) plane in the graphite is preferably 0.34 nm or less. More specifically, examples of the carbon material include pyrolytic carbons, cokes, glassy carbon fiber, organic polymer compound fired body, activated charcoal, and carbon blacks. The cokes include pitch coke, needle coke, petroleum coke, and the like. The organic polymer compound fired body may be obtained by firing (carbonizing) a polymer compound such as a phenol resin and a furan resin at an appropriate temperature. In addition to this, the carbon material may be low crystalline carbon or amorphous carbon that is subjected to heat treatment at a temperature of approximately 1000° C. or less.

The shape of the carbon material may be any of a fiber shape, a spherical shape, a particle shape, and a scale shape. Above all, the carbon material preferably includes two or more different shaped carbon materials. This is because filling of the carbon material improves, and therefore, it is possible to obtain a higher energy density.

The kind of the silicon material is not particularly limited as long as the silicon material is any one or more kinds of materials containing silicon as a constituent element. That is, the silicon material may be an elementary substance of silicon, a compound of silicon, an alloy of silicon, or two or more kinds thereof. Alternatively, the silicon material may be a material which has one or more phases of an elementary substance of silicon, a compound of silicon, and an alloy of silicon in at least a part. The structure of the silicon material includes, for example, a solid solution, a eutectoid (eutectic mixture), an intermetallic compound, and two or more kinds of coexisting materials thereof.

However, the "elementary substance" described above means an elementary substance (which may contain a very small amount of impurities) used in a general sense, and does not necessarily mean to have a purity of 100%. The definition of the elementary substance also applies to the following description.

The alloy of silicon may be not only a material containing one or more kinds of metal elements as a constituent element, but also a material containing one or more kinds of metalloid elements as a constituent element. The alloy of silicon may include one or more kinds of non-metal elements as a constituent element.

The alloy of silicon include, for example, any one or more kinds of elements such as tin, nickel, copper, iron, cobalt, manganese, zinc, indium, silver, titanium, germanium, bismuth, antimony, and chromium, as a constituent element other than silicon. The compound of silicon includes, for example, any one or more kinds of elements such as carbon and oxygen as a constituent element other than silicon. The compound of silicon may include, for example, any one or more kinds of a series of elements described about the alloy of silicon as a constituent element other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, SiTiNi, SiTiAl, $Si_2N_2O$, $SiO_x$ ($0<x\leq2$), and LiSiO.

Among these, the compound of silicon is preferably a silicon oxide ($SiO_x$). This is because the silicon oxide has excellent reversibility in occlusion and release of lithium. Thus, it is possible to obtain an excellent cycle characteristics in the secondary battery.

This x is not particularly limited as long as it is within the above-mentioned range ($0<x\leq2$), but above all, x is preferably in the range of $0.5\leq x\leq1.5$. This is because a high battery capacity is obtained and the reversibility in occlusion and release of lithium is improved. Specifically, when x is smaller than 0.5, the battery capacity is increased, but the amount of silicon oxide expanded during charging/discharging becomes larger. Therefore, the reversibility in occlusion and release of lithium may be deteriorated due to pulverization of silicon oxide. On the other hand, when x is larger than 1.5, the reversibility in occlusion and release of lithium is improved, but the battery capacity may be reduced.

The average particle diameter (median size D50) of the compound of silicon ($SiO_x$) is not particularly limited and is, for example, in the range of 0.1 μm to 10 μm. The specific surface area of the compound of silicon ($SiO_x$) is not particularly limited and is, for example, in the range of 1 $m^2/g$ to 10 $m^2/g$.

The negative electrode material is a material obtained by combining the carbon material and silicon material described above, and may also be any one or more kinds of other materials. That is, the negative electrode active material layer 14B may contain two kinds of negative electrode materials (carbon material and silicon material) and any one or more kinds of other negative electrode materials.

The other negative electrode material is, for example, a material (metallic material) containing any one or more kinds of metal elements and metalloid elements as a constituent element. This is because a high energy density is obtained. However, the above-mentioned silicon material is excluded from the metallic material described here.

The metallic material may be an elementary substance, a compound, an alloy, or two or more kinds thereof. Alternatively, the metallic material may be a material which has any one or more phases of an elementary substance, a compound, and an alloy in at least a part. However, the alloy may include not only a material containing two or more kinds of metal elements as a constituent element, but also a material containing at least one kind of metal element and at least one kind of metalloid element as constituent elements. The alloy may include one or more kinds of non-metal elements as a constituent element. The structure of the metallic material includes, for example, a solid solution, a eutectoid (eutectic mixture), an intermetallic compound, and two or more kinds of coexisting materials thereof.

The metal element and metalloid element described above are, for example, any one or more kinds of metal elements and metalloid elements that can form an alloy with lithium. Specific examples thereof include magnesium (Mg), boron (B), aluminum (Al), gallium (Ga), indium (In), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among these, tin is preferable. This is because tin has an excellent capability of occluding and releasing of lithium, and therefore, it is possible to obtain a remarkably high energy density.

The material (tin material) containing tin as a constituent element may be an elementary substance of tin, a compound of tin, an alloy of tin, or two or more kinds thereof. Alternatively, the tin material may be a material which has one or more phases of an elementary substance of tin, a compound of tin, and an alloy of tin in at least a part.

The alloy of tin include, for example, any one or more kinds of elements such as silicon, nickel, copper, iron, cobalt, manganese, zinc, indium, silver, titanium, germanium, bismuth, antimony, and chromium, as a constituent element other than tin. The compound of tin includes, for example, any one or more kinds of elements such as carbon and oxygen as a constituent element other than tin. The compound of tin may include, for example, any one or more kinds of a series of elements described about the alloy of tin as a constituent element other than tin.

Specific examples of the alloy and compound of tin in $SnO_w$ (0<w≤2), $SnSiO_3$, LiSnO, and $Mg_2Sn$.

In particular, it is preferable that the tin material be, for example, a material (Sn-containing material) containing tin as a first constituent element and also containing second and third constituent elements. The second constituent element includes, for example, any one or more kinds of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, any one or more kinds of elements such as boron, carbon, aluminum, and phosphorus (P). When the Sn-containing material includes the second constituent element and the third constituent element, it is possible to obtain a high battery capacity and excellent cycle characteristics.

Above all, the Sn-containing material is preferably a material (SnCoC-containing material) containing tin, cobalt, and carbon as constituent elements. The SnCoC-containing material has, for example, a content of carbon in the range of 9.9% by mass to 29.7% by mass and a ratio of contents of tin and cobalt (Co/(Sn+Co)) in the range of 20% by mass to 70% by mass. This is because a high energy density is obtained.

The SnCoC-containing material has a phase including tin, cobalt, and carbon, and it is preferable that the phase have a low crystalline structure or an amorphous structure. Since this phase is a phase (reaction phase) that can react with lithium, it is possible to obtain an excellent characteristic due to the presence of the reaction phase. Of course, the reaction phase may include a low crystalline portion and an amorphous portion. It is preferable that a half width (a diffraction angle 2θ) of a diffraction peak that can be obtained by an X-ray diffraction of the reaction phase be 1° or more in the case where CuKα rays are used as specific X-rays and a sweeping velocity is set to 1°/min. This is because lithium is relatively smoothly occluded and released in the SnCoC-containing material, and a reaction property of the SnCoC-containing material with an electrolytic solution decreases. The SnCoC-containing material may have a phase including an elementary substance or a part of each constituent element in some cases, in addition to the low crystalline phase or the amorphous phase.

It is possible to easily determine whether or not a diffraction peak that can be obtained by X-ray diffraction corresponds to the reaction phase that can react with lithium by comparing X-ray diffraction charts before and after an electrochemical reaction with lithium, for example. Specifically, for example, in the case where the position of the diffraction peak varies before and after the electrochemical reaction with lithium, this corresponds to the reaction phase that can react with lithium. In this case, for example, the diffraction peak of the low crystalline or amorphous reaction phase is seen in a range of 2θ=20° to 50°. Such a reaction phase includes, for example, the respective constituent elements described above, and it is considered that the reaction phase is crystallized to a low degree or becomes amorphous mainly because of the presence of carbon.

In the SnCoC-containing material, it is preferable that at least a part of carbon which is a constituent element be bonded to a metal element or a metalloid element which is another constituent element. This is because agglomeration or crystallization of tin or the like is suppressed. It is possible to confirm a bonding state of elements by using X-ray photoelectron spectroscopy (XPS), for example. In a commercially available apparatus, for example, as soft X-rays, Al—Kα rays, Mg—Kα rays, or the like are used. In the case where at least a part of carbon is bonded to a metal element, a metalloid element, or the like, a peak of a synthetic wave of the 1s orbit of carbon (C1s) appears in a region lower than 284.5 eV. Energy calibration is made so that the peak of the 4f orbit of gold atom (Au4f) is obtained at 84.0 eV. At this time, since surface contamination carbon is generally present on a material surface, the peak of C1s of the surface contamination carbon is set to 284.8 eV, which is used as an energy reference. In XPS measurement, the waveform of the peak of C1s is obtained as a shape including the peak of the surface contamination carbon and the peak of carbon in the SnCoC-containing material. Therefore, for example, by analyzing with commercially available software, both the peaks are separated. In the analysis of the waveform, the position of the main peak that is present on the lowest bound energy side is set to the energy reference (284.8 eV).

The SnCoC-containing material is not limited to a material (SnCoC) that contains only tin, cobalt, and carbon as constituent elements. The SnCoC-containing material may further include, for example, any one or more kinds of silicon, iron, nickel, chromium, indium, niobium, germanium, titanium, molybdenum, aluminum, phosphorus, gallium, and bismuth as constituent elements, in addition to tin, cobalt, and carbon.

Other than the SnCoC-containing material, a material (SnCoFeC-containing material) containing tin, cobalt, iron, and carbon as constituent elements may be also preferable. Any composition of the SnCoFeC-containing material may be adopted. To give an example, in the case where the content of iron is set smaller, the content of carbon may be in the range of 9.9% by mass to 29.7% by mass, the content of iron may be in the range of 0.3% by mass to 5.9% by mass, and the ratio of contents of tin and cobalt (Co/(Sn+Co)) may be in the range of 30% by mass to 70% by mass. Alternatively, in the case where the content of iron is set larger, the content of carbon may be in the range of 11.9% by mass to 29.7% by mass, the ratio of contents of tin, cobalt, and iron ((Co+Fe)/(Sn+Co+Fe)) may be in the range of 26.4% by mass to 48.5% by mass, and the ratio of contents of cobalt and iron (Co/(Co+Fe)) may be in the range of 9.9% by mass to 79.5% by mass. This is because such composition ranges allow for achievement of high energy density. The physical characteristics (such as a half width) of the SnCoFeC-containing material are similar to those of the SnCoC-containing material described above.

Other than the materials mentioned above, another negative electrode material is, for example, a metal oxide, a polymer compound, or the like. Examples of the metal oxide include an iron oxide, a ruthenium oxide, and a molybdenum oxide. Examples of the polymer compound include polyacetylene, polyaniline, and polypyrrole.

The negative electrode active material layer 14B is formed by, for example, any one or more methods such as a coating method, a vapor phase method, a liquid phase method, a thermal spraying method, and a firing method (sintering method).

The coating method is, for example, a method in which a particulate (powdery) negative electrode active material is mixed with a negative electrode binder or the like, the resultant mixture is dispersed in an organic solvent, and the resultant dispersed solution is applied to the negative electrode current collector 14A.

Examples of the vapor phase method include a physical deposition method and a chemical deposition method. More specifically, examples thereof include a vacuum deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which a negative electrode active material in a molten state or a semi-molten state is sprayed onto the surface of the negative electrode current collector 14A.

The firing method is, for example, a method in which a mixture dispersed in an organic solvent or the like is applied to the negative electrode current collector 14A using the coating method, and the resultant mixture is then subjected to heat treatment at a temperature higher than the melting point of a negative electrode binder or the like. Examples of the firing method include an atmospheric firing method, a reaction firing method, and a hot press firing method.

In such a secondary battery, as described above, in order to prevent lithium from being unintentionally precipitated on the negative electrode 14 during charging, the electrochemical equivalent of the negative electrode material that is able to occlude and release lithium is larger than that of the positive electrode. When the open circuit voltage (i.e., battery voltage) of the battery which is fully charged is 4.25 V or higher, the amount of lithium released per unit mass becomes larger as compared with the case where it is 4.20 V, even when the same positive electrode active material is used. Accordingly, the amounts of the positive electrode active material and the negative electrode active material are adjusted. This makes it possible to achieve high energy density.

The separator 15 is disposed between the positive electrode 13 and the negative electrode 14, and both electrodes 13, 14 are isolated with the separator 15 interposed therebetween. The separator 15 allows lithium ions to pass therethrough while preventing a short circuit caused by contact between the positive electrode 13 and the negative electrode 14.

The separator 15 includes, for example, any one or more kinds of porous films such as synthetic resin and ceramic, or may be a multilayer film in which two or more porous films are laminated. The synthetic resin includes, for example, any one or more kinds of polytetrafluoroethylene, polypropylene, polyethylene, and the like.

The separator 15 may include, for example, the above-mentioned porous film (a base material layer) and a polymer compound layer provided on the base material layer. This is because the adhesion of the positive electrode 13 and the negative electrode 14 each to the separator 15 improves, and therefore, the wound electrode body 10 is less likely to be deformed. This makes it possible to suppress decomposition reaction of the electrolytic solution and also suppress leakage of the electrolytic solution with which the base material layer is impregnated. Therefore, even after charge and discharge are repeated, electrical resistance is less prone to increase, and the secondary battery is less likely to swell.

The polymer compound layer may be provided on one side of the base material layer alone or on both sides thereof. The polymer compound layer includes, for example, any one or more kinds of polymer compound such as polyvinylidene fluoride. This is because polyvinylidene fluoride is excellent in physical strength and electrochemically stable. In a case of forming a polymer compound layer, for example, a solution in which a polymer compound is dissolved with an organic solvent is applied to the base material layer and the base material layer is then dried. Alternatively, the base material layer may be immersed in the solution and be then dried.

The electrolyte layer 16 includes an electrolytic solution and a polymer compound and in the electrolyte layer 16, the electrolytic solution is held by the polymer compound. That is, this electrolyte layer 16 described herein is a so-called gel type electrolyte. The electrolyte layer 16 is used because high ion conductivity (e.g., 1 mS/cm or more at room temperature) can be obtained and a leakage of the electrolytic solution is prevented.

For example, the electrolyte layer 16 (positive electrode side electrolyte layer 161) herein is provided on the positive electrode 13 (positive electrode active material layer 13B) and the electrolyte layer 16 (negative electrode side electrolyte layer 162) is provided on the negative electrode 14 (negative electrode active material layer 14B). Accordingly, for example, the positive electrode side electrolyte layer 161 is disposed between the positive electrode 13 and the separator 15, and the negative electrode side electrolyte layer 162 is disposed between the negative electrode 14 and the separator 15.

In the case where the positive electrode active material layer 13B is provided on both surfaces of the positive electrode current collector 13A, the positive electrode side electrolyte layer 161 may be provided on each of two positive electrode active material layers 13B or on either one of the two positive electrode active material layers 13B.

Further, in the case where the negative electrode active material layer 14B is provided on both surfaces of the negative electrode current collector 14A, the negative electrode side electrolyte layer 162 may be provided on each of two negative electrode active material layers 14B or on either one of the two negative electrode active material layers 14B.

However, the positive electrode 13 provided with the positive electrode side electrolyte layer 161 and the negative electrode 14 provided with no negative electrode side electrolyte layer 162 may be employed. Alternatively, the negative electrode 14 provided with the negative electrode side electrolyte layer 162 and the positive electrode 13 provided with no positive electrode side electrolyte layer 161 may be employed. Of course, the positive electrode 13 provided with the positive electrode side electrolyte layer 161 and the negative electrode 14 provided with the negative electrode side electrolyte layer 162 may be employed.

FIG. 2 shows, for example, the case where the positive electrode side electrolyte layer 161 is provided on the positive electrode 13 (each of two positive electrode active material layers 13B) and the negative electrode side electrolyte layer 162 is provided on the negative electrode 14 (each of two negative electrode active material layers 14B).

Hereinafter, as necessary, two designations "positive electrode side electrolyte layer 161" and "negative electrode side electrolyte layer 162" are used, and the positive electrode side electrolyte layer 161 and the negative electrode side electrolyte layer 162 are collectively referred to as "electrolyte layer 16".

The polymer compound includes any one or more kinds of homopolymers, copolymers, and any other polymers.

Examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polyvinyl formal, polymethylmethacrylate, polyethylmethacrylate, polyacrylic acid, polymethacrylic acid, poly(methyl acrylate), poly(ethyl acrylate), styrene-butadiene rubber, nitrile butadiene rubber, polystyrene, and polycarbonate.

Among these, the homopolymer is preferably polyvinylidene fluoride. This is because it is electrochemically stable.

The copolymer includes two or more kinds of polymerizable compounds as a component. The "polymerizable compound" is a generic term for compounds containing an unsaturated bond (a carbon-carbon double bond).

"The copolymer includes two or more kinds of polymerizable compounds as a component" means that using two or more of raw materials (so-called monomers), a copolymer is formed by polymerization reaction of the two or more raw materials.

Specifically, the polymerizable compound is a raw material (monomer) for forming a copolymer. Since the polymerizable compound includes an unsaturated bond (carbon-carbon double bond), the polymerizable compound is subjected to polymerization reaction (polymerization) using the unsaturated bond (carbon-carbon double bond) contained in the polymerizable compound in the step of forming a copolymer.

The kinds of the polymerizable compound are not particularly limited, and examples thereof include vinylidene fluoride, hexafluoropropylene, monomethyl maleate, trifluoroethylene, tetrafluoroethylene, and chlorotrifluoroethylene.

Examples of the copolymer include a copolymer containing vinylidene fluoride and hexafluoropyrene as components; and a copolymer containing vinylidene fluoride, hexafluoropropylene, and monomethyl maleate as components.

Among these, the copolymer is preferably a copolymer containing vinylidene fluoride and hexafluoropyrene as components. This is because it is electrochemically stable.

In regard to the electrolyte layer 16 that is a gel-type electrolyte, the "solvent" contained in the electrolytic solution refers to a broad concept that encompasses not only liquid materials but also materials having ion conductivity that can dissociate electrolyte salts. Therefore, in the case of using the polymer compound having the ion conductivity, the polymer compound is also included in the solvent.

The electrolytic solution contains a solvent and an electrolyte salt. However, it may further contain any one or more kinds of other materials such as an additive.

The solvent includes any one or more kinds of nonaqueous solvents such as organic solvents. The electrolytic solution containing a nonaqueous solvent is a so-called nonaqueous electrolytic solution.

Examples of the nonaqueous solvent include carbonate ester (cyclic carbonate ester and chain carbonate ester), lactone, chain carboxylate ester, and nitrile. This is because an excellent battery capacity, excellent cycle characteristics, and excellent storage characteristics can be obtained. Examples of the cyclic carbonate ester include ethylene carbonate, propylene carbonate, and butylene carbonate, and examples of the chain carbonate ester include dimethyl carbonate, diethyl carbonate, ethyl methyl carbonate, and methyl propyl carbonate. Examples of the lactone include γ-butyrolactone and γ-valerolactone. Examples of the carboxylate ester include methyl acetate, ethyl acetate, methyl propionate, ethyl propionate, methyl butyrate, methyl isobutyrate, methyl trimethyl acetate, and ethyl trimethylacetate. Examples of the nitrile include acetonitrile, glutaronitrile, adiponitrile, methoxyacetonitrile, and 3-methoxypropionitrile.

In addition to this, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, or the like. This is because a similar advantage is obtained.

Among these, the carbonate ester is preferably any one or more kinds of ethylene carbonate, propylene carbonate, dimethyl carbonate, diethyl carbonate, and ethyl methyl carbonate. This is because a more excellent battery capacity, more excellent cycle characteristics, and more excellent storage characteristics can be obtained. In this case, a combination of a solvent having high viscosity (high dielectric constant) (e.g., relative permittivity $\varepsilon \geq 30$) such as ethylene carbonate and propylene carbonate, and a solvent having low viscosity (e.g., viscosity$\leq 1$ mPa·s) such as dimethyl carbonate, ethyl methyl carbonate, and diethyl carbonate may be more preferable. This is because dissociation of the electrolyte salt and ion mobility are improved.

In particular, the nonaqueous solvent is preferably any one or more kinds of an unsaturated cyclic carbonate ester, a halogenated carbonate ester, a sulfonate ester, an acid anhydride, a dinitrile compound (dinitrile), a diisocyanate compound, a phosphate ester, and the like. This is because chemical stability of the electrolytic solution is improved.

The unsaturated cyclic carbonate ester refers to a cyclic carbonate ester having one or more unsaturated bonds (carbon-carbon double bond or carbon-carbon triple bond). When the solvent includes an unsaturated cyclic carbonate ester, a film derived from the unsaturated cyclic carbonate ester is formed on a surface of the negative electrode 14 mainly during charging/discharging, which thereby suppresses a decomposition reaction of the electrolytic solution on the surface of the negative electrode 14.

Examples of the unsaturated cyclic carbonate ester include vinylene carbonate (1,3-dioxole-2-one), vinyl ethylene carbonate (4-vinyl-1,3-dioxolane-2-one), and methylene ethylene carbonate (4-methylene-1,3-dioxolane-2-one). The content of the unsaturated cyclic carbonate ester in the solvent is not particularly limited, and is in the range of, for example, 0.01% by weight to 10% by weight.

The halogenated carbonate ester refers to a cyclic or chain carbonate ester containing one or more halogens as constituent elements. When the solvent includes a halogenated cyclic carbonate ester, a film derived from the halogenated cyclic carbonate ester is formed on a surface of the negative electrode 14 mainly during charging/discharging, which thereby suppresses a decomposition reaction of the electrolytic solution on the surface of the negative electrode 14.

Examples of the cyclic halogenated carbonate ester include 4-fluoro-1,3-dioxolane-2-one and 4,5-difluoro-1,3-dioxolane-2-one. Examples of the chain halogenated carbonate ester include fluoromethyl methyl carbonate, bis (fluoromethyl) carbonate, and difluoromethyl methyl carbonate. The content of the halogenated carbonate ester in the solvent is not particularly limited, and is in the range of, for example, 0.01% by weight to 50% by weight.

Examples of the sulfonate ester include 1,3-propane sultone and 1,3-propene sultone. The content of the sulfonate ester in the solvent is not particularly limited, and is in the range of, for example, 0.5% by weight to 5% by weight.

Examples of the acid anhydride include a carboxylic anhydride, a disulfonic anhydride, and a carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. The content of the acid anhydride in the solvent is not particularly limited, and is in the range of, for example, 0.5% by weight to 5% by weight.

The dinitrile compound is, for example, a compound represented by $NC-C_mH_{2m}-CN$ (where m is an integer of 1 or more). Examples of the dinitrile compound include succinonitrile ($NC-C_2H_4-CN$), glutaronitrile ($NC-C_3H_6-CN$), adiponitrile ($NC-C_4H_8-CN$), and phthalonitrile ($NC-C_6H_4-CN$). The content of the dinitrile compound in the solvent is not particularly limited, and is in the range of, for example, 0.5% by weight to 5% by weight.

The diisocyanate compound is, for example, a compound represented by $OCN-C_nH_{2n}-NCO$ (where n is an integer of 1 or more). Examples of the diisocyanate compound include hexamethylene diisocyanate ($OCN-C_6H_{12}-NCO$). The content of the diisocyanate compound in the solvent is not particularly limited, and is in the range of, for example, 0.5% by weight to 5% by weight.

Examples of the phosphate ester include trimethyl phosphate and triethyl phosphate. The content of the phosphate ester in the solvent is not particularly limited, and is in the range of, for example, 0.5% by weight to 5% by weight.

Among these, the nonaqueous solvent is preferably one or both of the unsaturated cyclic carbonate ester and the halogenated carbonate ester. This is because, as described above, using the film formed on the surface of the negative electrode 14, a decomposition reaction of the electrolytic solution on the surface of the negative electrode 14 is effectively suppressed.

The electrolyte salt includes, for example, any one or more kinds of salts such as a lithium salt. However, the electrolyte salt may contain, for example, a salt other than the lithium salt. Examples of the salt other than the lithium salt include a salt of a light metal other than lithium.

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This is because an excellent battery capacity, excellent cycle characteristics, and excellent storage characteristics can be obtained.

Among these, any one or more kinds of lithium hexafluorophosphate, lithium tetrafluoroborate, lithium perchlorate, and lithium hexafluoroarsenate is preferable, and lithium hexafluorophosphate is more preferable. This is because the internal resistance decreases, thereby achieving a higher effect.

The content of the electrolyte salt is not particularly limited. However, above all, the content thereof is preferably in the range of 0.3 mol/kg to 3.0 mol/kg with respect to the solvent. This is because high ion conductivity can be obtained.

The electrolyte layer 16 may further contain any one or more kinds of other materials.

The other materials are, for example, any one or more kinds of a plurality of inorganic particles. The plurality of inorganic particles mainly plays a role of improving safety of the secondary battery. More specifically, when the electrolyte layer 16 includes a plurality of inorganic particles, the separator 15 is less likely to be oxidized during charging/discharging of the secondary battery. Thus, a short circuit is less likely to occur between the positive electrode 13 and the negative electrode 14, and therefore, the safety of the secondary battery is improved.

The kind of the plurality of inorganic particles is not particularly limited. Specifically, the plurality of inorganic particles includes, for example, any one or more kinds of inorganic materials such as ceramic (insulating material). Examples of the ceramic include metal oxides such as aluminum oxide ($Al_2O_3$), zirconium oxide ($ZrO_2$), titanium oxide ($TiO_2$), and magnesium oxide ($MgO_2$). This is because oxidation of the separator 15 is sufficiently suppressed, thereby fully preventing a short circuit from occurring.

The average particle diameter (median size D50) and the specific surface area (BET specific surface area) of the plurality of inorganic particles are not particularly limited. Specifically, the average particle diameter thereof is, for example, in the range of 0.1 μm to 2.5 μm. The specific surface area thereof is, for example, in the range of 0.5 $m^2$/g to 11 $m^2$/g.

The content of the plurality of inorganic particles in the electrolyte layer 16 is not particularly limited, and may be appropriately set.

The secondary battery may operate as follows, for example.

During charging, lithium ions are released from the positive electrode 13, and are occluded by the negative electrode 14 through the electrolyte layer 16. On the other hand, during discharging, lithium ions are released from the negative electrode 14, and are occluded by the positive electrode 13 through the electrolyte layer 16.

The secondary battery is manufactured, for example, by fabricating the positive electrode 13 and the negative electrode 14, forming the electrolyte layer 16, and then assembling these components as described below.

In the case of fabricating the positive electrode 13, first, a positive electrode active material is mixed with a positive electrode binder, a positive electrode conducting agent and the like to give a positive electrode mixture. Subsequently, the positive electrode mixture is dispersed or dissolved in an organic solvent or the like and thereby paste-like positive electrode mixture slurry is obtained. Finally, the positive electrode mixture slurry is applied onto both surfaces of the positive electrode current collector 13A, and the applied positive electrode mixture slurry is dried to form the positive electrode active material layer 13B. Thereafter, the positive electrode active material layer 13B may be compression-molded using a roll press machine or the like. In this case, the positive electrode active material layer 13B may be compression-molded while being heated, or this compression molding may be performed plural times.

In the case of fabricating the negative electrode 14, the negative electrode active material layer 14B is formed on both surfaces of the negative electrode current collector 14A as in the manufacturing procedure for the positive electrode 13. Specifically, a negative electrode mixture obtained by mixing a negative electrode active material (including a carbon material and a silicon material) with a negative electrode binder, a negative electrode conducting agent, and the like is dispersed or dissolved in an organic solvent or the like, and thereby paste-type negative electrode mixture slurry is obtained. Subsequently, this negative electrode mixture slurry is applied to both surfaces of the negative electrode current collector 14A, and then dried, and thereby the negative electrode active material layer 14B is formed. Then, the negative electrode active material layer 14B is compression-molded using a roll press machine according to necessity. According to necessity, after the negative electrode active material layer 14B is formed, it may be subjected to heat treatment.

In the case of forming the electrolyte layer 16, first, an electrolyte salt or the like is dissolved in a solvent to thereby prepare an electrolytic solution. Subsequently, the electrolytic solution and a polymer compound, a plurality of inorganic particles, a solvent for dilution (e.g., organic solvent), or the like, as necessary, are mixed and the resultant mixture is stirred to thereby prepare a sol-like precursor solution. Finally, the precursor solution is applied to the surface of the positive electrode 13 (positive electrode active material layer 13B) using a coating device, and the applied precursor solution is then dried to thereby form a gel-like electrolyte layer 16 (positive electrode side electrolyte layer 161). In addition, the precursor solution is applied to the surface of the negative electrode 14 (negative electrode active material layer 14B) using a coating device, and the applied precursor solution is then dried to thereby form a gel-like electrolyte layer 16 (negative electrode side electrolyte layer 162).

In the case of assembling the secondary battery, first, the positive electrode lead 11 is attached to the positive electrode current collector 13A by a welding method or the like, and the negative electrode lead 12 is attached to the negative electrode current collector 14A by a welding method or the like. Subsequently, the positive electrode 13 and the negative electrode 14 laminated with the separator 15 and the electrolyte layer 16 interposed therebetween are wound to thereby fabricate the wound electrode body 10. Then, the protective tape 17 is adhered to the outermost peripheral portion of the wound electrode body 10. Finally, the exterior member 20 is folded so as to sandwich the wound electrode body 10, and thereafter, the outer peripheral edges of the exterior member 20 are bonded to each other by a thermal fusion method or the like to seal the wound electrode body 10 in the exterior member 20. In this case, an adhesive film 21 is inserted between the positive electrode lead 11 and the exterior member 20 and an adhesive film 21 is inserted between the negative electrode lead 12 and the exterior member 20.

According to the secondary battery, the negative electrode current collector 14A in the negative electrode 14 is used in which the ratio of the displacement amount D2 in the piercing test at a piercing speed V2 of less than 0.1 mm/min with respect to the displacement amount D1 in the piercing test at a piercing speed V1 of 0.1 mm/min or more is 0.968 or more. Further, the negative electrode current collector 14A satisfies the conditional formulas (7) and (8). Thus, for example, even in the case where expansion and shrinkage of the negative electrode active material layer 14B occur along with charge/discharge, the negative electrode current collector 14A is less likely to be broken. Generally, the rate of expansion and shrinkage of the negative electrode active material layer 14B along with charge/discharge of the secondary battery is less than 0.1 mm/min. Therefore, the negative electrode current collector 14A of which the displacement amount D2 is equal to or larger than the displacement amount D1 is relatively less likely to be broken.

Therefore, the secondary battery having such a negative electrode current collector 14A is made smaller and lighter by reducing the thickness of the negative electrode current collector 14A, and can obtain excellent battery characteristics.

First, a second secondary battery according to an embodiment of the present technology will be described.

Figure 4A:
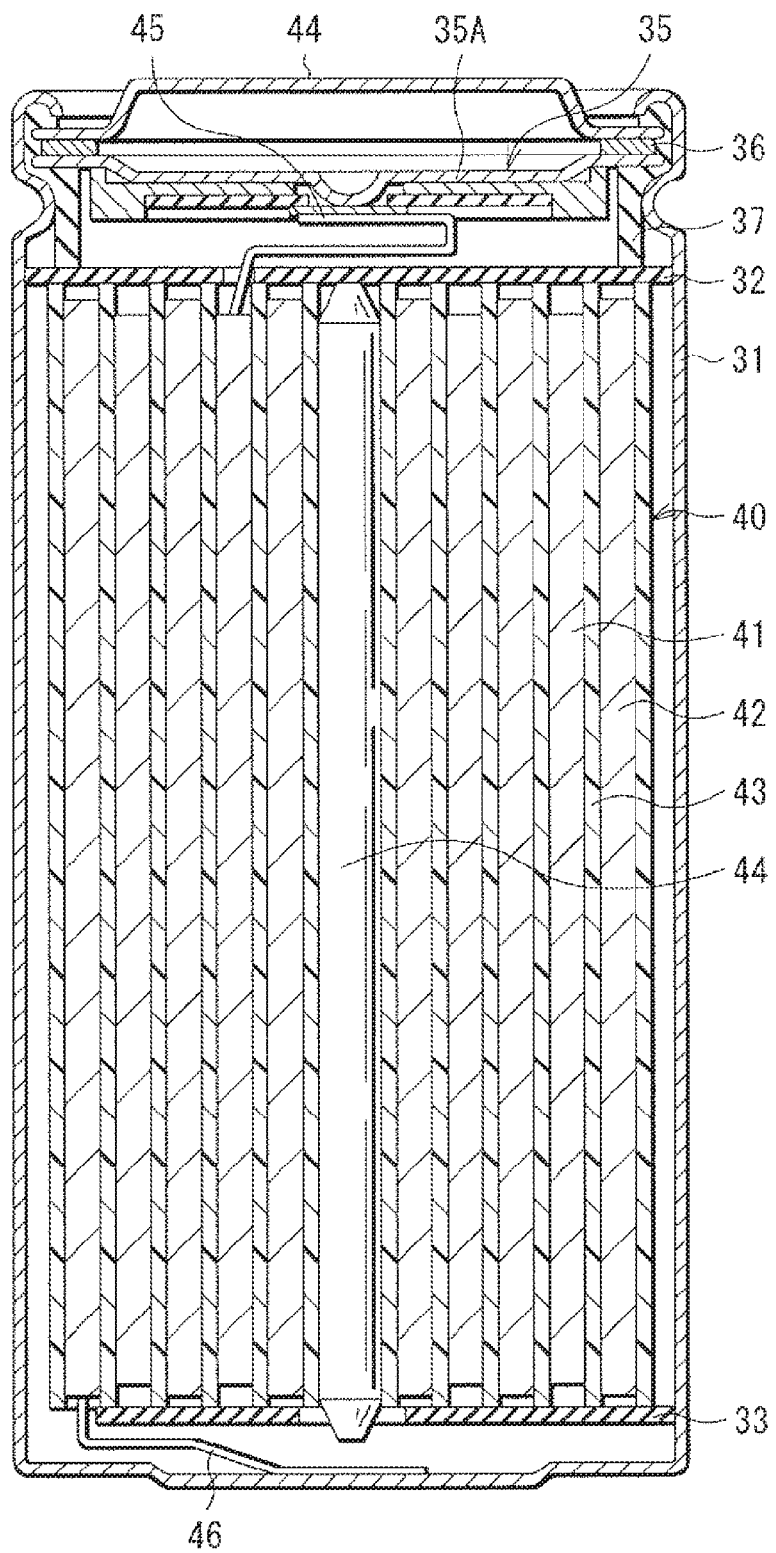
FIG. 4A is a sectional view showing the configuration of another (cylinder type) secondary battery according to an embodiment of the present technology.
Figure 4B:
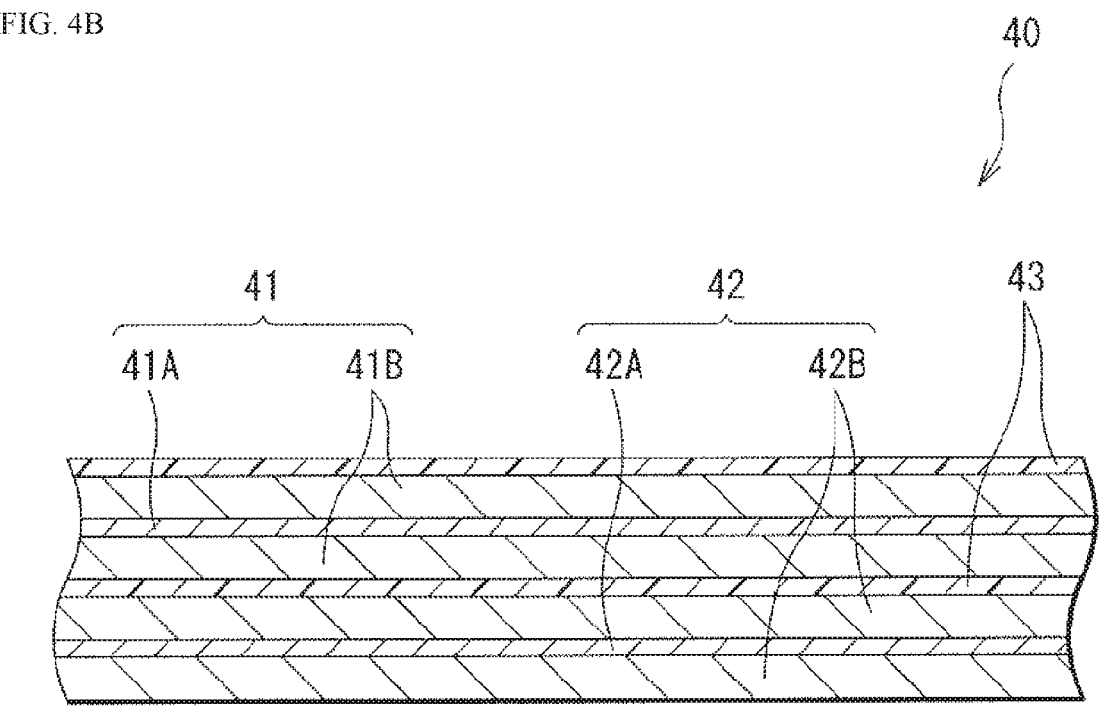
FIG. 4B is a sectional view showing an enlarged part of the wound electrode body shown in FIG. 4A according to an embodiment of the present technology.

FIG. 4A shows a perspective view of a second secondary battery. FIG. 4B shows a sectional configuration of the wound electrode body 40 shown in FIG. 4A. The second secondary battery is, for example, a lithium ion secondary battery, which is the same as the foregoing first secondary battery. The second secondary battery mainly includes a wound electrode body 40 in which a positive electrode 41 and a negative electrode 42 are laminated with a separator 43 interposed therebetween and wound, the separator being impregnated with a proper electrolytic solution; and a pair of insulating plates 32, 33 in a battery can 31 having a substantially hollow cylindrical shape. The battery configuration including the battery can 31 is of a so-called cylinder type.

The battery can 31 has, for example, a hollow structure with one end being closed and the other end being open, and includes, for example, any one or more kinds of iron, aluminum, alloys thereof, and the like. A surface of the battery can 31 may be plated with nickel or the like. The pair of insulating plates 32, 33 sandwich the wound electrode body 40 and extends perpendicularly to a winding circumferential surface of the wound electrode body 40.

At the opened end of the battery can 31, a battery lid 34, a safety valve mechanism 35, and a positive temperature coefficient device (PTC device) 36 are crimped through a gasket 37, and therefore, the battery can 31 is sealed. The battery lid 34 includes, for example, the same material as that of the battery can 31. Each of the safety valve mechanism 35 and the PTC device 36 is provided on the inner side of the battery lid 34. The safety valve mechanism 35 is electrically connected to the battery lid 34 through the PTC device 36. In the safety valve mechanism 35, when an internal pressure reaches or exceeds a certain level due to an internal short circuit, heating from outside, or the like, a disc plate 35A inverts, and therefore, the battery lid 34 and the wound electrode body 40 are electrically disconnected. In order to prevent abnormal heat generation due to a large current, electrical resistance of the PTC device 36 increases in response to an increase in temperature. The gasket 37 includes, for example, an insulating material, and a surface thereof may be coated with asphalt or the like.

For example, a center pin 44 is inserted in a space formed at the winding center of the wound electrode body 40. However, the center pin 44 may be omitted. A positive electrode lead 45 is connected to the positive electrode 41, and a negative electrode lead 46 is connected to the negative electrode 42. The positive electrode lead 45 includes, for example, a conductive material such as aluminum. This positive electrode lead 45 is, for example, connected to the safety valve mechanism 35 and is electrically continuous with the battery lid 34. The negative electrode lead 46 includes, for example, a conductive material such as nickel. This negative electrode lead 46 is, for example, connected to the battery can 31 and is electrically continuous with the battery can 31.

The positive electrode 41 has, for example, a positive electrode active material layer 41B provided on both surfaces of a positive electrode current collector 41A. However, the positive electrode active material layer 41B may be provided on one side of the positive electrode current collector 41A alone. The configurations of the positive electrode current collector 41A and the positive electrode active material layer 41B are the same as those of the positive electrode current collector 13A and the positive electrode active material layer 13B, respectively, in the first secondary battery described above.

The negative electrode 42 has the same configuration as the foregoing negative electrode 14 and has, for example, a negative electrode active material layer 42B provided on both surfaces of a negative electrode current collector 42A. The configurations of the negative electrode current collector 42A and the negative electrode active material layer 42B are the same as those of the negative electrode current collector 14A and the negative electrode active material layer 14B, respectively, in the negative electrode 14 described above. That is, in the negative electrode current collector 42A in the negative electrode 42, the ratio of the displacement amount D2 in the piercing test at a piercing speed V2 of less than 0.1 mm/min with respect to the displacement amount D1 in the piercing test at a piercing speed V1 of 0.1 mm/min or more is 0.968 or more. In the negative electrode 42, it is preferable that a chargeable capacity of the negative electrode material capable of occluding and releasing lithium be larger than a discharge capacity of the positive electrode 41.

In addition, the separator 43 and the electrolytic solution with which the separator 43 is impregnated are the same as the separator 15 of the first secondary battery and the electrolytic solution with which the separator 15 is impregnated, respectively.

The secondary battery may operate as follows, for example.

During charging, when lithium ions are released from the positive electrode 41, they are occluded in the negative electrode 42 through the electrolytic solution. On the other hand, during discharging, when lithium ions are released from the negative electrode 42, they are occluded in the positive electrode 41 through the electrolytic solution with which the separator 43 is impregnated.

The secondary battery is manufactured in the following procedure, for example.

First, for example, by the same procedure as the procedure of fabricating the positive electrode 13 and the negative electrode 14 in the foregoing first secondary battery, the positive electrode active material layer 41B is formed at both surfaces of the positive electrode current collector 41A and thereby the positive electrode 41 is fabricated, and the negative electrode active material layer 42B is formed at both surfaces of the negative electrode current collector 42A, and thereby the negative electrode 42 is fabricated. Then, the positive electrode lead 45 is attached to the positive electrode 41 by welding or the like, and the negative electrode lead 46 is attached to the negative electrode 42. Subsequently, the wound electrode body 40 is fabricated by stacking the positive electrode 41 and the negative electrode 42 with the separator 43 interposed therebetween, and winding them, and the center pin 44 is inserted into the winding center thereof. The wound electrode body 40 is then accommodated inside the battery can 31 while being sandwiched between the pair of insulating plates 32 and 33, and an end of the positive electrode lead 45 is welded to the safety valve mechanism 35 and an end of the negative electrode lead 46 is welded to the battery can 31. Subsequently, an electrolytic solution is injected inside the battery can 31 to impregnate the separator 43. Finally, the battery lid 34, the safety valve mechanism 35, and the PTC device 36 are crimped to the opening end of the battery can 31 with a gasket 37, to thereby be secured. Thus, the second secondary battery shown in FIGS. 4A and 4B is completed.

According to the secondary battery, in the negative electrode current collector 42A in the negative electrode 42, the ratio of the displacement amount D2 in the piercing test at a piercing speed V2 of less than 0.1 mm/min with respect to the displacement amount D1 in the piercing test at a piercing speed V1 of 0.1 mm/min or more is 0.968 or more. Further, the negative electrode current collector 14A satisfies the conditional formulas (7) and (8). Thus, for example, even in the case where expansion and shrinkage of the negative electrode active material layer 42B occur along with charge/discharge, the negative electrode current collector 42A is less likely to be broken.

Therefore, the secondary battery having such a negative electrode current collector 42A is made smaller and lighter by reducing the thickness of the negative electrode current collector 42A, and can obtain excellent battery characteristics.

Next, an application example of the above-described secondary battery will be described.

The use of the secondary battery is not particularly limited as long as this secondary battery can be used as a power source for driving or a power storage source for accumulating electric power in a machine, an apparatus, instrument, a device, a system (assembly of a plurality of apparatuses or the like) and the like. The secondary battery used as a power source may be a main power source or an auxiliary power source. The main power source is a power source that is preferentially used, with or without other power source. The auxiliary power source may be, for example, a power source that is used instead of the main power source, or a power source that is switched from the main power source as necessary. In the case of using the secondary battery as an auxiliary power source, the kind of the main power source is not limited to the secondary battery.

Examples of the use of the secondary battery include the following: an electronic device (including a portable electronic device) such as a video camera, a digital still camera, a mobile telephone, a notebook personal computer, a cordless telephone, a headphone stereo, a portable radio, a portable television, and a portable information terminal; a portable household electric apparatus such as an electric shaver; a storage device such as a backup power source and a memory card; an power tool such as an electric drill and an electric slicer; a battery pack that is mounted on a notebook personal computer and the like as an attachable and detachable power source; a medical electronic device such as a pacemaker and a hearing aid; an electric vehicle such as an electric automobile (including a hybrid automobile); and a power storage system such as a household battery system that accumulates electric power for an emergency. Of course, the secondary battery may be used for an application other than those described above.

Above all, it is effective for the secondary battery to be applied to a battery pack, an electric vehicle, a power storage system, a power tool, an electronic device, and the like. This is because in these applications, excellent battery characteristics are required, and therefore, the use of the secondary battery according to the present technology makes it possible to effectively improve performance. The battery pack is a power source using the secondary battery. This battery pack may use a single cell or an assembled battery as described below. The electric vehicle is a vehicle which operates (runs) by using the secondary battery as a driving power source, and may be an automobile (a hybrid automobile or the like) which is provided with another driving source other than the secondary battery. The power storage system is a system using the secondary battery as a power storage source. For example, for a household power storage system, electric power is accumulated in the secondary battery which serves as a power storage source, thus making it possible to use home electric appliances and the like through the use of electric power. The power tool is a tool which r rakes a movable section (e.g., a drill) movable with the secondary battery as a driving power source. The electronic device is a device which executes various functions of the secondary battery as a driving power source (power supply source).

Here, some application examples of the secondary battery will be specifically described. It should be understood that the configuration of each application example described below is just considered by way of example, and can be changed appropriately.

Figure 5:
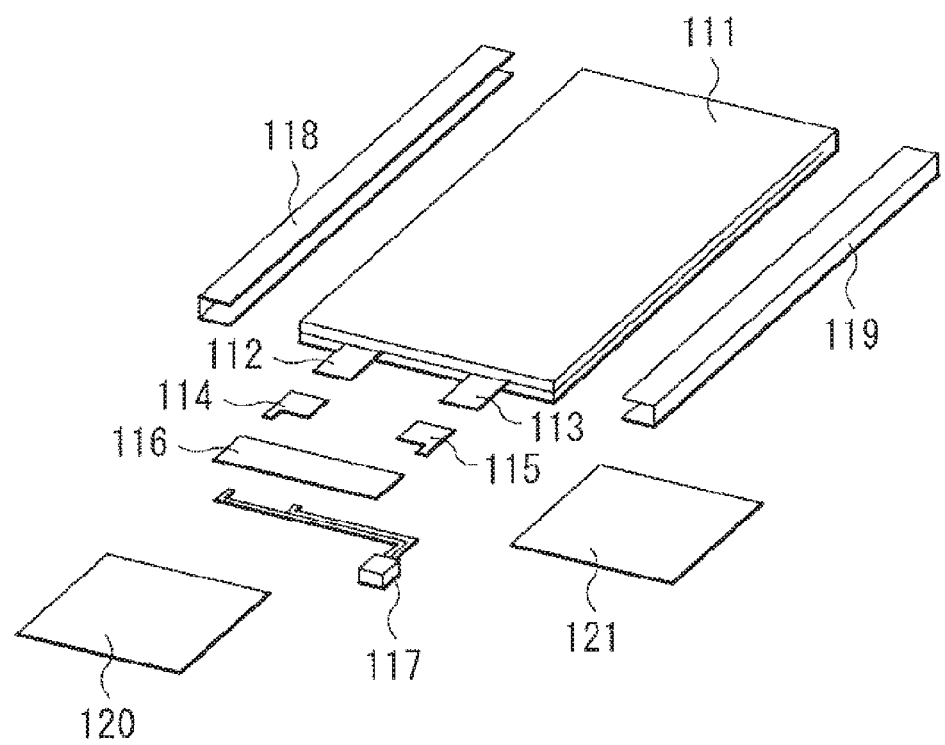
FIG. 5 is a perspective view showing the configuration of an application example (battery pack: single cell) of a secondary battery according to an embodiment of the present technology.
Figure 6:
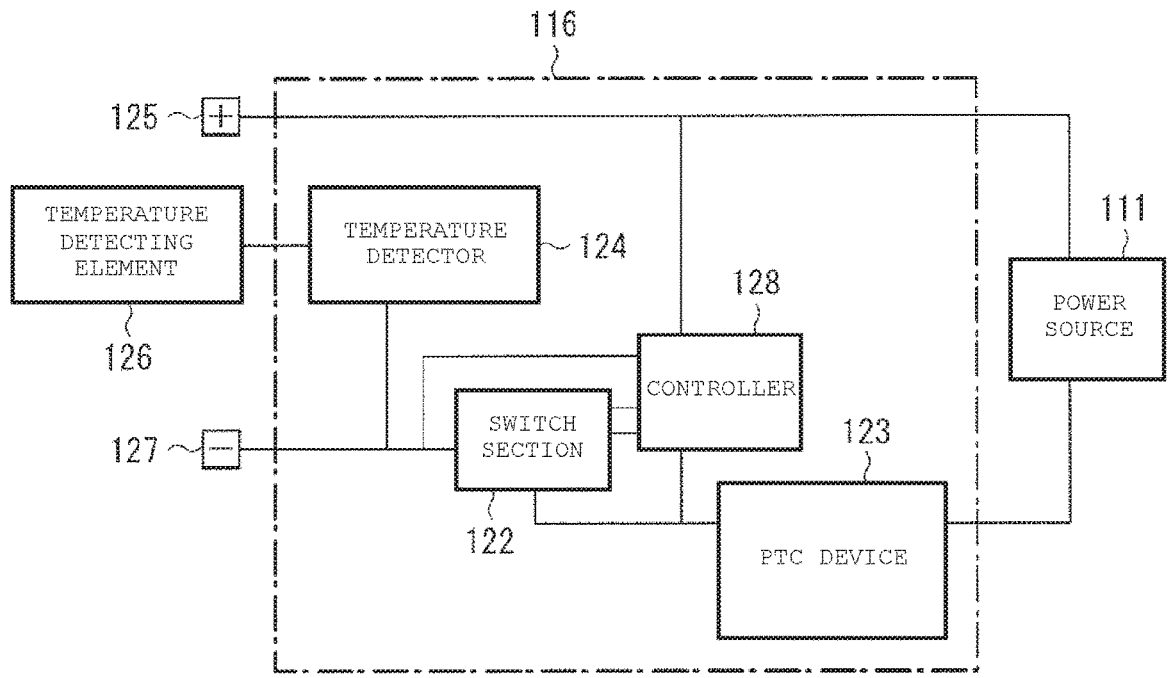
FIG. 6 is a block diagram showing the configuration of the battery pack shown in FIG. 5.

FIG. 5 shows a perspective view of a battery pack using a single cell. FIG. 6 shows the block configuration of the battery pack shown in FIG. 5. In addition, FIG. 5 illustrates the battery pack in an exploded state.

The battery pack described herein is a simplified battery pack (a so-called soft pack) that uses one secondary battery of the present technology, and is mounted on, for example, an electronic device typified by a smartphone. This battery pack includes, for example, a power source 111 as a laminated film type secondary battery, and a circuit board 116 connected to the power source 111, as shown in FIG. 5. A positive electrode lead 112 and a negative electrode lead 113 are attached to the power source 111.

A pair of adhesive tapes 118, 119 are attached to both side surfaces of the power source 111. A protection circuit (PCM: Protection Circuit Module) is formed in the circuit board 116. The circuit board 116 is connected to the positive electrode lead 112 through a tab 114, and connected to the negative electrode lead 113 via a tab 115. Moreover, the circuit board 116 is connected to a lead 117 provided with a connector for external connection. With the circuit board 116 connected to the power source 111, the circuit board 116 is protected by a label 120 and an insulating sheet 121. The label 120 is attached to fix the circuit board 116 and the insulating sheet 121.

The battery pack includes, for example, the power source 111 and the circuit board 116 as shown in FIG. 6. The circuit board 116 includes, for example, a controller 128, a switch section 122, a PTC device 123, and a temperature detector 124. The power source 111 is connectable to the outside through a positive electrode terminal 125 and a negative electrode terminal 127, and is thereby charged and discharged through the positive electrode terminal 125 and the negative electrode terminal 127. The temperature detector 124 detects a temperature using a temperature detection element (a so-called T terminal) 126.

The controller 128 controls an operation of the entire battery pack (including a used state of the power source 111). The controller 128 includes, for example, a central processing unit (CPU) and a memory.

For example, when a battery voltage reaches an overcharge detection voltage, the controller 128 may cause the switch section 122 to be disconnected so that a charge current does not flow into a current path of the power source 111. Moreover, for example, when a large current flows during charging, the controller 128 may cause the switch section 122 to be disconnected, thereby blocking the charge current.

In addition, for example, when a battery voltage reaches an overdischarge detection voltage, the controller 128 may cause the switch section 122 to be disconnected so that a discharge current does not flow into a current path of the power source 111. Moreover, for example, when a large current flows during discharging, the controller 128 may cause the switch section 122 to be disconnected, thereby blocking the discharge current.

The overcharge detection voltage of the secondary battery is, for example, 4.2 V±0.05 V, and the overdischarge detection voltage is, for example, 2.4 V±0.1 V.

The switch section 122 switches the used state of the power source 111, that is, whether the power source 111 is connected to an external device or not, in accordance with an instruction from the controller 128. The switch section 122 includes, for example, a charge control switch and a discharge control switch. The charge control switch and the discharge control switch each are, for example, a semiconductor switch such as a field-effect transistor using a metal oxide semiconductor (MOSFET). The charge current and the discharge current are detected on the basis of on-resistance of the switch section 122, for example.

The temperature detector 124 measures a temperature of the power source 111, and outputs a measurement result of the temperature to the controller 128. The temperature detector 124 includes, for example, a temperature detecting element such as a thermistor. The measurement result of the temperature determined by the temperature detector 124 is used, for example, in the case where the controller 128 performs charge and discharge control at the time of abnormal heat generation, and in the case where the controller 128 performs a correction process at the time of calculating remaining capacity.

The circuit board 116 may include no PTC device 123. In this case, a PTC device may be separately attached to the circuit board 116.

Figure 7:
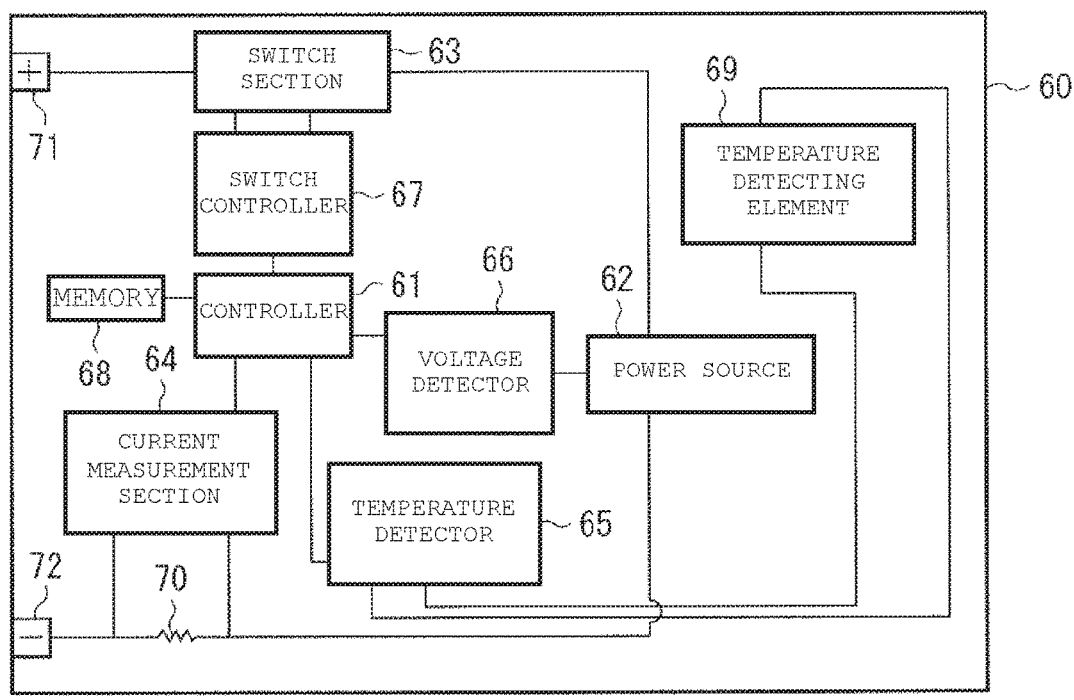
FIG. 7 is a block diagram showing the configuration of an application example (battery pack: assembled battery) of a secondary battery according to an embodiment of the present technology.

FIG. 7 shows a block configuration of a battery pack using an assembled battery.

The battery pack includes, for example, a controller 61, a power source 62, a switch section 63, a current measurement section 64, a temperature detector 65, a voltage detector 66, a switch controller 67, a memory 68, a temperature detecting element 69, a current detection resistance 70, a positive electrode terminal 71, and a negative electrode terminal 72 inside a housing 60. The housing 60 includes, for example, a plastic material and the like.

The controller 61 controls an operation of the entire battery pack (including a used stat of the power source 62). The controller 61 includes, for example, a CPU and the like. The power source 62 is an assembled battery including two or more kinds of secondary battery of the present technology, and the connection form of the two or more kinds of secondary battery may be a connection in series, a connection in parallel, or a mixed type of the both. To give an example, the power source 62 includes six secondary batteries connected in the form of two in parallel and three in series.

The switch section 63 switches the used state of the power source 62, that is, whether the power source 62 is connected to an external device or not, in accordance with an instruction from the controller 61. The switch section 63 includes, for example, a charge control switch, a discharge control switch, a charging diode, a discharging diode, and the like. The charge control switch and the discharge control switch each are, for example, a semiconductor switch such as a field-effect transistor using a metal oxide semiconductor (MOSFET).

The current measurement section 64 measures a current using the current detection resistance 70, and outputs a measurement result of the current to the controller 61. The temperature detector 65 measures a temperature using the temperature detecting element 69, and outputs a measurement result of the temperature to the controller 61. The measurement result of the temperature is used, for example, in the case where the controller 61 performs charge and discharge control at the time of abnormal heat generation, and in the case where the controller 61 performs a correction process at the time of calculating remaining capacity. The voltage detector 66 measures voltages of the secondary batteries in the power source 62, and supplies the measurement results of the voltages converted from analog to digital to the controller 61.

The switch controller 67 controls an operation of the switch section 63 in accordance with signals inputted from the current measurement section 64 and the voltage detector 66.

For example, when a battery voltage reaches an overcharge detection voltage, the switch controller 67 may cause the switch section 63 (the charge control switch) to be disconnected so that a charge current does not flow into a current path of the power source 62. This makes it possible to perform only discharge through the discharging diode in the power source 62. For example, when a large current flows during charging, the switch controller 67 blocks the charge current.

In addition, for example, when a battery voltage reaches an overdischarge detection voltage, the switch controller 67 may cause the switch section 63 (the discharge control switch) to be disconnected so that a discharge current does not flow into a current path of the power source 62. This makes it possible to perform only charge through the charging diode in the power source 62. For example, when a large current flows during discharging, the switch controller 67 blocks the discharge current.

The overcharge detection voltage of the secondary battery is, for example, 4.2 V±0.05 V, and the overdischarge detection voltage is, for example, 2.4 V±0.1 V.

The memory 68 includes, for example, an EEPROM that is a non-volatile memory. The memory 68 holds, for example, numerical values calculated by the controller 61, information of the secondary battery measured in a manufacturing process (e.g., internal resistance in an initial state), and the like. When the memory 68 holds full charge capacity of the secondary battery, the controller 61 is allowed to comprehend information such as remaining capacity.

The temperature detecting element 69 measures a temperature of the power source 62, and outputs a measurement result of the temperature to the controller 61. The temperature detecting element 69 includes, for example, a thermistor and the like.

The positive electrode terminal 71 and the negative electrode terminal 72 are terminals that are connected to an external device (e.g., a notebook personal computer) driven using the battery pack, an external device (e.g., a battery charger) used for charge of the battery pack, or the like. The power source 62 is charged and discharged through the positive electrode terminal 71 and the negative electrode terminal 72.

Figure 8:
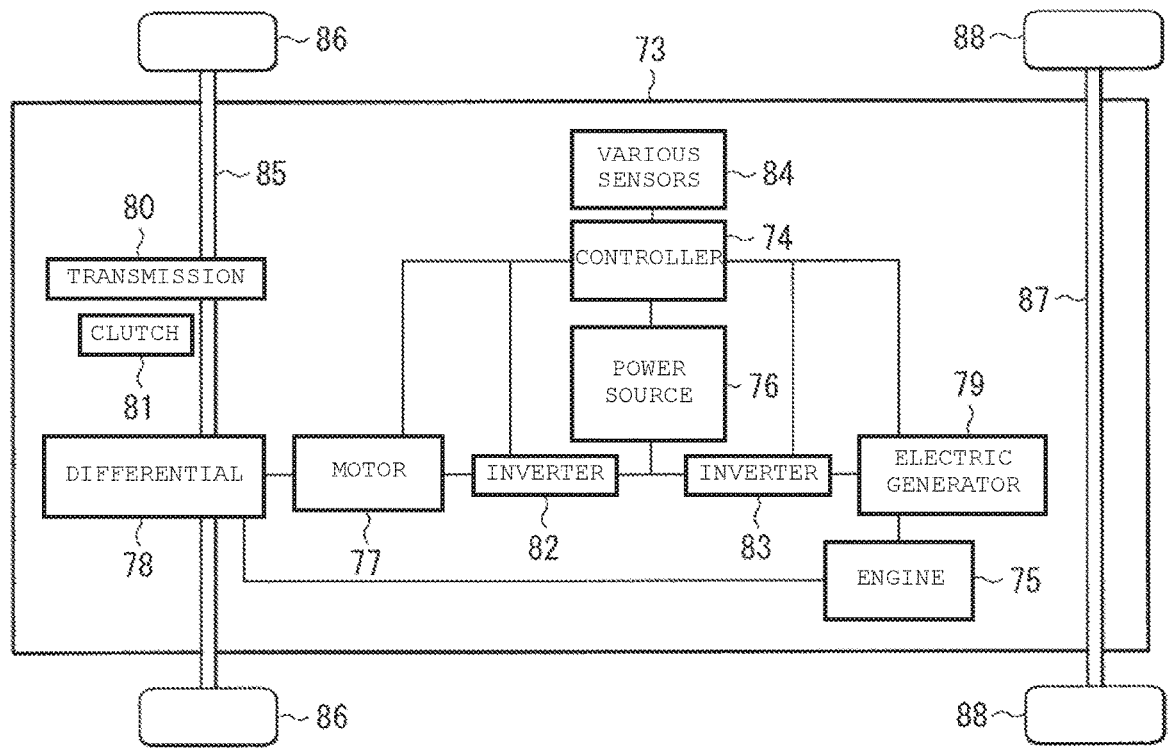
FIG. 8 is a block diagram showing the configuration of an application example (electric vehicle) of a secondary battery according to an embodiment of the present technology.

FIG. 8 shows a block configuration of a hybrid automobile that is an example of an electric vehicle.

The electric vehicle includes, for example, a controller 74, an engine 75, a power source 76, a driving motor 77, a differential 78, an electric generator 79, a transmission 80, a clutch 81, inverters 82, 83, and various sensors 84 inside a housing 73 made of metal. In addition to these, the electric vehicle includes, for example, a front drive shaft 85 and front wheels 86 that are connected to the differential 78 and the transmission 80, and a rear drive shaft 87, and rear wheels 88.

The electric vehicle can run using either of the engine 75 and the motor 77 as a drive source, for example. The engine 75 is a main power source and is, for example, a gasoline engine or the like. In the case where the engine 75 is used as the power source, driving force (torque) of the engine 75 is transferred to the front wheels 86 and the rear wheels 88 via the differential 78, the transmission 80, and the clutch 81 that are drive sections, for example. The torque of the engine 75 is transferred to the electric generator 79, and therefore, with use of the torque, the electric generator 79 generates alternating-current power, and the generated alternating-current power is converted into direct-current power by the inverter 83, and the direct-current power is accumulated in the power source 76. On the other hand, in the case where the motor 77 which is a conversion section (converter) is used as a power source, electric power (direct-current power) supplied from the power source 76 is converted into alternating-current power via the inverter 82, and the motor 77 is driven by utilizing the alternating-current power. Driving force (torque) obtained by converting the electric power by the motor 77 is transferred to the front wheels 86 and the rear wheels 88 via the differential 78, the transmission 80, and the clutch 81 that are the drive sections (driver), for example.

When speed of the electric vehicle is reduced by a brake mechanism, resistance at the time of speed reduction may be transferred to the motor 77 as torque, and therefore, the motor 77 may generate alternating-current power by utilizing the torque. It is preferable that, since this alternating-current power be converted into direct-current power by the inverter 82, the direct-current regenerative power be accumulated in the power source 76.

The controller 74 controls an operation of the entire electric vehicle. The controller 74 includes, for example, a CPU and the like. The power source 76 includes one or more kinds of secondary battery of the present technology. The power source 76 is connected to an external power source, and may be allowed to accumulate electric power by receiving power supply from the external power source. The various sensors 84 are used, for example, for control of the rotational frequency of the engine 75 and for control of a throttle valve aperture (a throttle aperture). The various sensors 84 include, for example, any one or more kinds of a speed sensor, an acceleration sensor, an engine rotational frequency sensor, and the like.

It should be understood that, although the description has been given of the case where the electric vehicle is the hybrid automobile, the electric vehicle may be a vehicle (an electric automobile) that operates using only the power source 76 and the motor 77 without using the engine 75.

Figure 9:
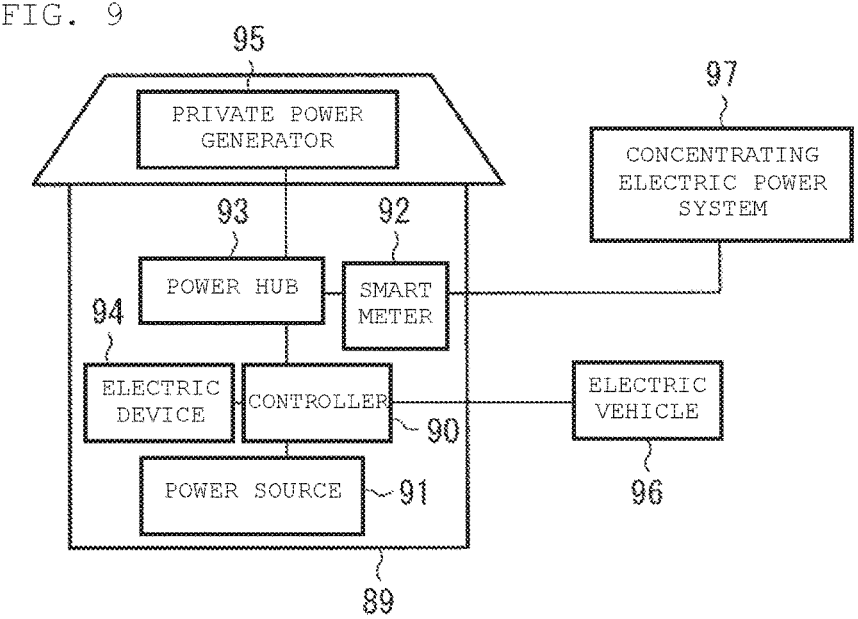
FIG. 9 is a block diagram showing the configuration of an application example (power storage system) of a secondary battery according to an embodiment of the present technology.

FIG. 9 shows a block configuration of a power storage system.

The power storage system includes, for example, a controller 90, a power source 91, a smart meter 92, and a power hub 93 inside a house 89 such as a general residence and a commercial building.

The power source 91 herein is connected to an electric device 94 provided inside the house 89 and is allowed to be connected to an electric vehicle 96 parked outside the house 89, for example. Further, for example, the power source 91 is connected to a private power generator 95 provided in the house 89 via the power hub 93, and is allowed to be connected to an outside concentrating electric power system 97 via the smart meter 92 and the power hub 93.

The electric device 94 includes, for example, one or more home electric products, and examples of the home electric products include a refrigerator, an air conditioner, a television, and a water heater. The private power generator 95 includes, for example, any one or more kinds of a solar power generator, a wind power generator, and other power generators. The electric vehicle 96 includes, for example, any one or more kinds of an electric automobile, an electric motorcycle, a hybrid automobile, and other electric vehicles. The concentrating electric power system 97 includes, for example, one or more kinds of a thermal power plant, an atomic power plant, a hydraulic power plant, a wind power plant, and other power plants.

The controller 90 controls an operation of the entire power storage system (including a used state of the power source 91). The controller 90 includes, for example, a CPU and the like. The power source 91 includes one or more kinds of secondary battery of the present technology. The smart meter 92 is, for example, a network-compatible electric power meter provided in the house 89 on a power demand side and is allowed to communicate with a power supply side. Accordingly, for example, the smart meter 92 controls balance between supply and demand in the house 89 while communicating with outside, thereby allowing highly efficient and stable supply of energy.

In the electric power storage system, for example, electric power is accumulated in the power source 91 from the concentrating electric power system 97, that is an external power source, via the smart meter 92 and the power hub 93, and electric power is accumulated in the power source 91 from the private power generator 95, that is an independent power source, via the power hub 93. The electric power accumulated in the power source 91 is supplied to the electric device 94 and the electric vehicle 96 in accordance with an instruction from the controller 90, thus allowing the operation of the electric device 94, and allowing the electric vehicle 96 to be charged. That is, the electric power storage system is a system that makes it possible to accumulate and supply electric power in the house 89 using the power source 91.

The electric power accumulated in the power source 91 is allowed to be used as necessary. Hence, for example, electric power is accumulated in the power source 91 from the concentrating electric power system 97 in the middle of night when an electric rate is inexpensive, and the electric power accumulated in the power source 91 can be used during the daytime when the electric rate is expensive.

The foregoing electric power storage system may be provided for each house household), or may be provided for a plurality of houses (a plurality of households).

Figure 10:
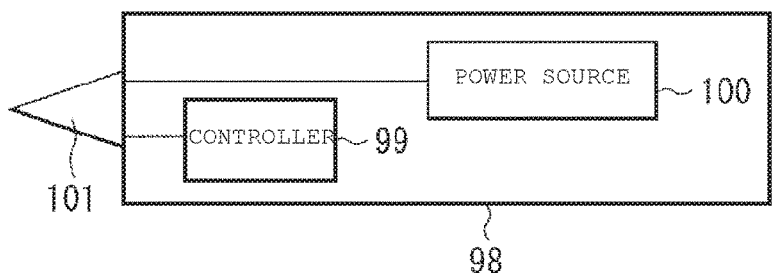
FIG. 10 is a block diagram showing the configuration of an application example (power tool) of a secondary battery according to an embodiment of the present technology.

FIG. 10 shows a block configuration of a power tool.

The power tool described herein is, for example, an electric drill. The electric power tool includes, for example, a controller 99 and a power source 100 inside a tool body 98. A drill section 101 that is a movable section is attached to the tool body 98 in an operable (rotatable) manner, for example.

The tool body 98 includes, for example, a plastic material and the like. The controller 99 controls an operation of the entire power tool (including a used state of the power source 100). The controller 99 includes, for example, a CPU and the like. The power source 100 includes one or more kinds of secondary battery of the present technology. The controller 99 allows electric power to be supplied from the power source 100 to the drill section 101 in accordance with an operation of an operation switch.

Examples of the present technology will be described in detail.

EXPERIMENTAL EXAMPLE 1

The cylinder type lithium ion secondary battery shown in FIGS. 4A and 4B was fabricated by the following procedure.

The positive electrode 41 was fabricated as follows. First, 94 parts by mass of a positive electrode active material ($LiNi_{0.5}Co_{0.2}Mn_{0.3}O_2$), 3 parts by mass of a positive electrode binder (polyvinylidene fluoride), and 3 parts by mass of a positive electrode conducting agent (DENKA BLACK) were mixed to thereby obtain a positive electrode mixture. Subsequently, the positive electrode mixture was dispersed in an organic solvent (N-methyl-2-pyrrolidone) to thereby obtain paste-like positive electrode mixture slurry. Subsequently, the positive electrode mixture slurry was applied to both surfaces of the positive electrode current collector 41A (an aluminum foil having a thickness of 15 μm) using a coating device, and the positive electrode mixture slurry was then dried in an oven at 120° C. to thereby form the positive electrode active material layer 41B. Finally, the positive electrode active material layer 41B was compression-molded using a roll press machine, and the positive electrode current collector 41A with the positive electrode active material layer 41B formed thereon was cut into a strip shape (width 58 mm, length 830 mm). In this case, the positive electrode active material layer 41B had a volume density of 3.40 $g/cm^3$.

The negative electrode 42 was fabricated as follows. First, 92 parts by mass of powdery natural graphite and 5 parts by mass of silicon oxide $SiO_x$ as negative electrode active materials, and 1.5 parts by mass of a negative electrode binder (carboxymethyl cellulose/styrene-butadiene rubber) were mixed to thereby obtain a negative electrode mixture. Subsequently, the negative electrode mixture was dispersed in an ion-exchange water to thereby obtain negative electrode mixture slurry. Subsequently, the negative electrode mixture slurry was applied to both surfaces of the negative electrode current collector 42A using a coating device, and the negative electrode mixture slurry was then dried to thereby form the negative electrode active material layer 42B. As the negative electrode current collector 42A, as shown in Table 1, a copper foil having a thickness of 10 μm in which the ratio of the displacement amount D2 with respect to the displacement amount D1 (D2/D1) was 0.968 or more was used. Finally, the negative electrode active material layer 42B was compression-molded using a roll press machine, and the negative electrode current collector 42A with the negative electrode active material layer 42B formed thereon was cut into a strip shape (width 60 mm, length 910 mm). In this case, the negative electrode active material layer 42B had a volume density of 1.495 $g/cm^3$.

The electrolytic solution was obtained by mixing ethylene carbonate (EC), fluoroethylene carbonate (FEC), and dimethyl carbonate (DMC) to prepare a mixed solvent, and then dissolving an electrolyte salt ($LiPF_6$) in the mixed solvent. At this time, the composition ratio of the mixed solvent (EC:FEC:DMC) was 30:10:60 by a weight ratio thereof, and the content $LiPF_6$ was 1.2 mol/kg with respect to the solvent.

When the secondary battery was assembled, first, the positive electrode 41, the separator 43, the negative electrode 42, and the separator were laminated in this order and then wound to fabricate the wound electrode body 40. Next, while the wound electrode body 40 was sandwiched between the pair of insulating plates 32 and 33, the negative electrode lead 46 was welded to the battery can 31, and the positive electrode lead 45 was welded to the safety valve mechanism 35. Thereafter, the wound electrode body 40 was accommodated inside the battery can 31. Further, an electrolytic solution was injected inside the battery can 31, and thereafter, the battery lid 34 was crimped to the battery can 31 with the gasket 37 therebetween, and as a result thereof, a cylinder type secondary battery having an outer diameter of 18 mm and a height of 65 mm was obtained.

The secondary battery in Example 1 thus obtained was charged under conditions of an ambient temperature of 23° C., a charge voltage of 4.20 V, a charge current of 3000 mA, and a charge time of 2.5 hours, and then discharged under conditions of a discharge current of 600 mA and a final voltage of 2.0 V, to thereby measure an initial capacity. The initial capacity was 3100 mAh. The resistance measured at a frequency of 1 kHz was 13.0 mΩ. Subsequently, further, a cycle in which the secondary battery was charged under conditions of an ambient temperature of 0° C., a charge voltage of 4.25 V, a charge current of 4000 mA, and a charge time of 2 hours, and then discharged under conditions of a discharge current of 10000 mA and a final voltage of 2.0 V, was performed until the capacity retention rate falls below 30%. Thereafter, when the secondary battery was disassembled in a drying room and the negative electrode 42 was observed, breaking of the negative electrode current collector 42A was not confirmed. When the negative electrode current collector 42A was obtained from the disassembled secondary battery, the negative electrode 42 was washed with DMC to remove the negative electrode active material layer 42B.

Figure 11:
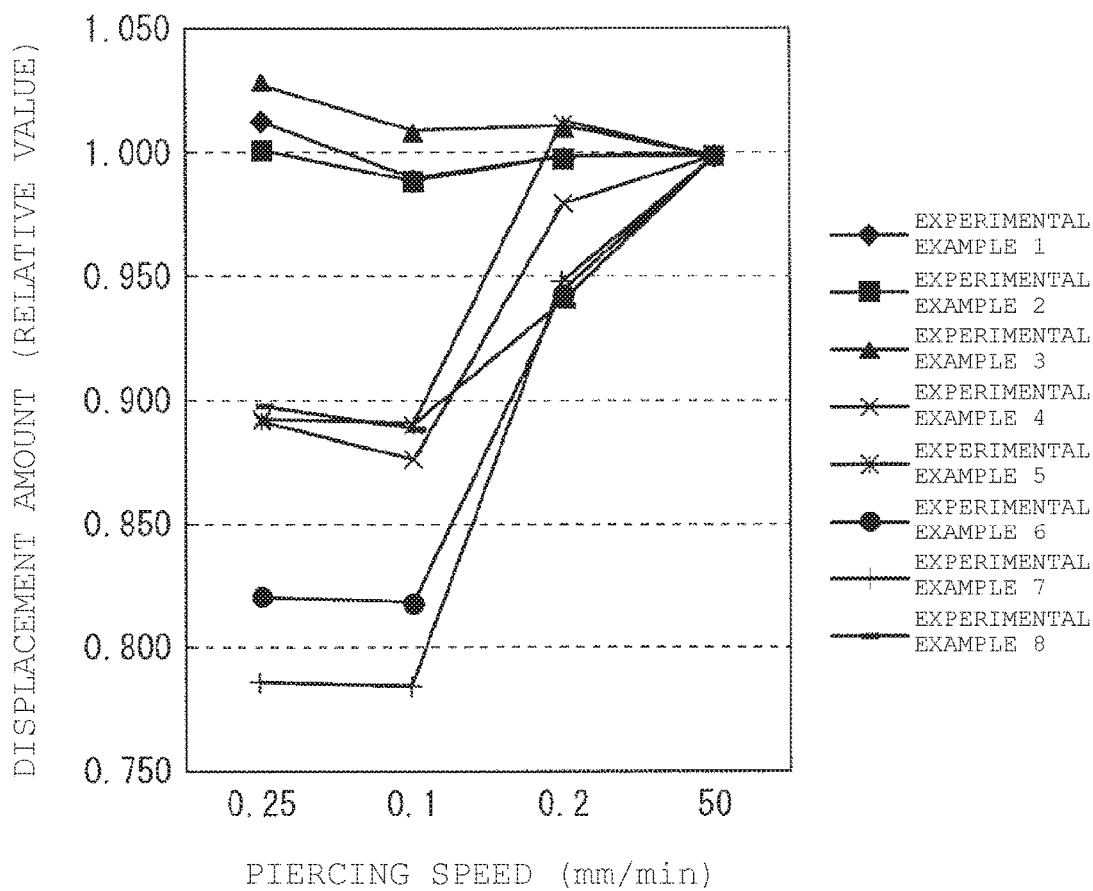
FIG. 11 illustrates characteristics showing the results of a piercing test in the Experimental Examples according to an embodiment of the present technology.

Next, the negative electrode current collector 42A in a region which was not coated with the negative electrode active material layer 42B was collected from the negative electrode 42 of the disassembled secondary battery, and a piercing test was then conducted with the collected current collector to determine a displacement amount D. Here, each of the inner diameters of the openings 51KA, 51KB in the pair of substrates 51A, 51B and the inner diameter (diameter) of the ring 54 was set to 10.0 mmφ. The piercing jig 53 made of stainless steel and having a 2.0 mmφ diameter hemispherical tip end portion 53T was brought into contact with the negative electrode current collector 42A that was clamped between the pair of substrates 51A and 51B under a pressure of 1 MPa. At this time, the piercing speed V was set to four levels of 0.025 mm/min, 0.1 mm/min, 0.2 mm/min, and 50 mm/min, and the displacement amount D at each level was determined. The results are shown in Table 1 and FIG. 11.

TABLE 1

| | Thickness of negative electrode current collector [μm] | Negative electrode active material | Displacement amount B [mm] (Relative value [—]) | | | | Breaking after cycle test |
|---|---|---|---|---|---|---|---|
| | | | 0.025 mm/min | 0.1 mm/min | 0.2 mm/min | 50 mm/min | |
| Experimental Example 1 | 10 | A type | 0.591 (1.014) | 0.577 (0.991) | 0.582 (0.999) | 0.582 (1.000) | Not broken |
| Experimental Example 2 | 10 | A type | 0.672 (1.002) | 0.664 (0.990) | 0.670 (0.999) | 0.670 (1.000) | Not broken |
| Experimental Example 3-1 | 10 | A type | 1.046 (1.029) | 1.026 (1.010) | 1.028 (1.011) | 1.016 (1.000) | Not broken |
| Experimental Example 3-2 | 10 | B type | | | | | Not broken |
| Experimental Example 3-3 | 10 | C type | | | | | Not broken |
| Experimental Example 4 | 10 | A type | 0.549 (0.894) | 0.538 (0.877) | 0.603 (0.981) | 0.614 (1.000) | Broken |
| Experimental Example 5 | 10 | A type | 0.654 (0.893) | 0.652 (0.891) | 0.742 (1.013) | 0.732 (1.000) | Broken |
| Experimental Example 6 | 10 | A type | 0.703 (0.822) | 0.700 (0.819) | 0.807 (0.945) | 0.854 (1.000) | Broken |
| Experimental Example 7 | 10 | A type | 0.409 (0.787) | 0.408 (0.785) | 0.494 (0.949) | 0.520 (1.000) | Broken |
| Experimental Example 8-1 | 10 | A type | 0.747 (0.898) | 0.739 (0.889) | 0.781 (0.939) | 0.832 (1.000) | Broken |
| Experimental Example 8-2 | 10 | B type | | | | | Broken |
| Experimental Example 8-3 | 10 | C type | | | | | Broken |

Among the negative electrode active materials of type A, type B, and type C having the physical properties shown in Table 2, the type A material was used in this Experimental Example.

TABLE 2

| Negative electrode active material | | A type | B type | C type |
|---|---|---|---|---|
| Content of SiO [%] | | 6% | 10% | 10% |
| Volume density [g/cm³] | | 1.495 | 1.460 | 1.580 |
| Thickness of negative electrode [mm] | [1] After press-molding | 0.121 | 0.098 | 0.114 |
| | [2] Discharge state | 0.132 | 0.111 | 0.130 |
| | [3] Charge state | 0.146 | 0.127 | 0.151 |
| Expansion coefficient | [1] ⇒ [2] | 108.8% | 112.8% | 114.0% |
| | [1] ⇒ [3] | 120.5% | 129.5% | 132.2% |
| | [2] ⇒ [3] | 110.8% | 114.8% | 116.0% |

Figure 3B:
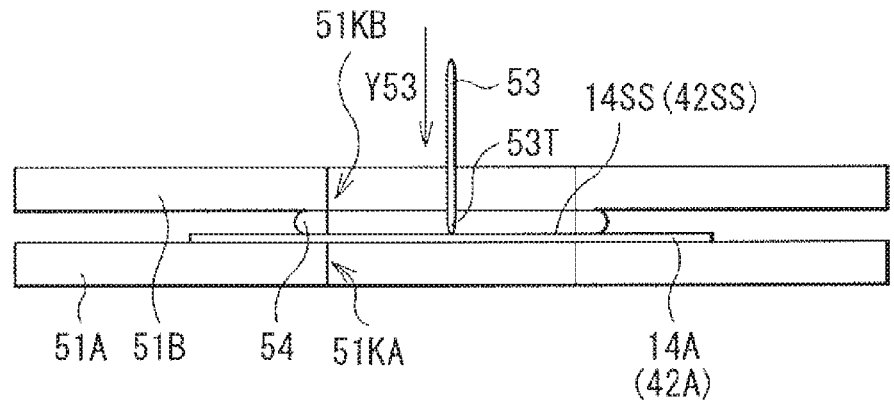
FIG. 3B is a sectional view illustrating the procedure for evaluating negative electrode current collector shown in FIG. 2.
Figure 3C:
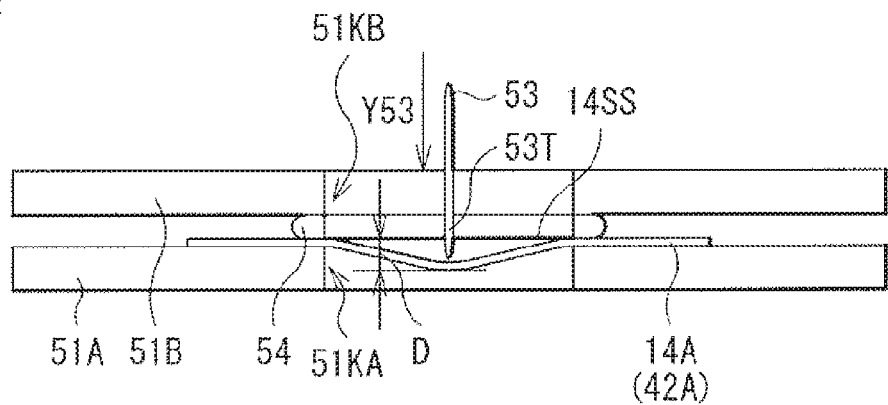
FIG. 3C is another sectional view illustrating the procedure for evaluating the negative electrode current collector shown in FIG. 2.

The piercing test was conducted as shown in FIGS. 3A to 3C to determine the displacement amount D. That is, as shown in FIG. 3A, a sample of the negative electrode current collector 42A was sandwiched between the pair of substrates 51A and 51B having openings 51KA, 51KB. Thereafter, in the negative electrode current collector 42A, the piercing jig 53 was brought closer to the portion where the openings 51KA and 51KB were overlapped at a constant piercing speed V, and was then traveled in the direction of the arrow Y53 so as to be orthogonal to the surface 42SS. After the tip end portion 53T of the piercing jig 53 was brought into contact with the surface 42SS (FIG. 3B), the piercing jig 53 was continuously traveled in the direction of the arrow Y53 at a constant piercing speed V until the sample of the negative electrode current collector 42A was broken (FIG. 3C). Thus, the displacement amount D of the tip end portion 53T in the direction of the arrow Y53 was determined from the time when the tip end portion 53T of the piercing jig 53 was brought into contact with the surface 42SS until the time when the sample of the negative electrode current collector 42A was broken. Table 1 and FIG. 11 each show numerical values obtained by standardizing the numerical value to 1 when the piercing speed V was 50 mm/min.

EXPERIMENTAL EXAMPLE 2

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was not confirmed.

EXPERIMENTAL EXAMPLE 3-1

The same procedure as in the foregoing Experimental Example 1 was performed to fabricate the secondary battery and to evaluate it, except that the characteristic values of the displacement amount D of the negative electrode current collector 42A were different, and the negative electrode 42 was subjected to heat treatment at 140° C. for 4 hours. The results are shown together in Table 1 and FIG. 11. In this experimental example, breaking of the negative electrode current collector 42A was not confirmed.

EXPERIMENTAL EXAMPLE 3-2

The same procedure as in the foregoing Experimental Example 3-1 was performed to fabricate the secondary battery and to evaluate it, except that the negative electrode active material of type B shown in Table 2 was used. The results are shown together in Table 1 and FIG. 11. In this experimental example, breaking of the negative electrode current collector 42A was not confirmed.

EXPERIMENTAL EXAMPLE 3-3

The same procedure as in the foregoing Experimental Example 3-1 was performed to fabricate the secondary battery and to evaluate it, except that the negative electrode active material of type C shown in Table 2 was used. The results are shown together in Table 1 and FIG. 11. In this experimental example, breaking of the negative electrode current collector 42A was not confirmed.

EXPERIMENTAL EXAMPLE 4

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was confirmed.

EXPERIMENTAL EXAMPLE 5

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was confirmed.

EXPERIMENTAL EXAMPLE 6

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was confirmed.

EXPERIMENTAL EXAMPLE 7

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was confirmed.

EXPERIMENTAL EXAMPLE 8-1

The same procedure as in the foregoing Experimental Example 1 was performed to fabricate the secondary battery and to evaluate it, except that the characteristic values of the displacement amount D of the negative electrode current collector 42A were different. The results are shown together in Table 1 and FIG. 11. In this experimental example, breaking of the negative electrode current collector 42A was confirmed.

EXPERIMENTAL EXAMPLE 8-2

The same procedure as in the foregoing Experimental Example 8-1 was performed to fabricate the secondary battery and to evaluate it, except that the negative electrode active material of type B shown in Table 2 was used. The results are shown together in Table 1 and FIG. 11. In this experimental example, breaking of the negative electrode current collector 42A was confirmed.

EXPERIMENTAL EXAMPLE 8-3

The same procedure as in the foregoing Experimental Example 8-1 was performed to fabricate the secondary battery and to evaluate it, except that the negative electrode active material of type C shown in Table 2 was used. The results are shown together in Table 1 and FIG. 11. In this experimental example, breaking of the negative electrode current collector 42A was confirmed.

As shown in Table 1, it was confirmed that the negative electrode current collector 42A was less likely to be broken after the cycle test in the case where the ratio of the displacement amount D2 in the piercing test at a piercing speed V2 of less than 0.1 mm/min (where V=0.025 mm/min) with respect to the displacement amount D1 in the piercing test at a piercing speed V1 of 0.1 mm/min or more (where V1=0.1 mm/min, 0.2 mm/min, and 50 mm/min) was 0.97 or more (Experimental Examples 1, 2, and 3-1 to 3-3).

EXPERIMENTAL EXAMPLE 9

The cylinder type lithium ion secondary battery shown in FIGS. 4A and 4B was fabricated by the following procedure.

The positive electrode 41 was fabricated as follows. First, 94 parts by mass of a positive electrode active material ($LiNi_{0.5}Co_{0.2}Mn_{0.3}O_2$), 3 parts by mass of a positive electrode binder (polyvinylidene fluoride), and 3 parts by mass of a positive electrode conducting agent (DENKA BLACK) were mixed to thereby obtain a positive electrode mixture. Subsequently, the positive electrode mixture was dispersed in an organic solvent (N-methyl-2-pyrrolidone) to thereby obtain paste-like positive electrode mixture slurry. Subsequently, the positive electrode mixture slurry was applied to both surfaces of the positive electrode current collector 41A (an aluminum foil having a thickness of 20 μm) using a coating device, and the positive electrode mixture slurry was then dried in an oven at 120° C. to thereby form the positive electrode active material layer 41B. Finally, the positive electrode active material layer 41B was compression-molded using a roll press machine, and the positive electrode current collector 41A with the positive electrode active material layer 41B formed thereon was cut into a strip shape (width 58 mm, length 980 mm). In this case, the positive electrode active material layer 41B had a volume density of 3.50 g/cm³.

The negative electrode 42 was fabricated as follows. First, powdery natural graphite and silicon oxide (SiO) as negative electrode active materials, and 1.5 parts by mass of a negative electrode binder (carboxymethyl cellulose/styrene-butadiene rubber) were mixed to thereby obtain a negative electrode mixture. The content of silicon oxide (SiO) was 10%. Subsequently, the negative electrode mixture was dispersed in an ion-exchange water to thereby obtain negative electrode mixture slurry. Subsequently, the negative electrode mixture slurry was applied to both surfaces of the negative electrode current collector 42A using a coating device, and the negative electrode mixture slurry was then dried to thereby form the negative electrode active material layer 42B. As the negative electrode current collector 42A, as shown in the margin of Table 3, a copper foil having a thickness of 12 μm was used. Finally, the negative electrode active material layer 42B was compression-molded using a roll press machine, and the negative electrode current collector 42A with the negative electrode active material layer 42B formed thereon was cut into a strip shape (width 60 mm, length 1010 mm). In this case, the negative electrode active material layer 42B had a volume density of 1.460 g/cm³.

The electrolytic solution was obtained by mixing ethylene carbonate (EC), fluoroethylene carbonate (FEC), and dimethyl carbonate (DMC) to prepare a mixed solvent, and then dissolving an electrolyte salt ($LiPF_6$) in the mixed solvent. At this time, the composition ratio of the mixed solvent (EC:FEC:DMC) was 30:10:60 by a weight ratio thereof, and the content of $LiPF_6$ was 1.2 mol/kg with respect to the solvent.

When the secondary battery was assembled, first, the positive electrode 41, the separator 43, the negative electrode 42, and the separator were laminated in this order and then wound to fabricate the wound electrode body 40. Next, while the wound electrode body 40 was sandwiched between the pair of insulating plates 32 and 33, the negative electrode lead 46 was welded to the battery can 31, and the positive electrode lead 45 was welded to the safety valve mechanism 35. Thereafter, the wound electrode body 40 was accommodated inside the battery can 31. Further, an electrolytic solution was injected inside the battery can 31, and thereafter, the battery lid 34 was crimped to the battery can 31 with the gasket 37 interposed therebetween, and as a result thereof, a cylinder type secondary battery having an outer diameter of 18 mm and a height of 65 mm was obtained.

The secondary battery thus obtained in Example 9 was disassembled and the negative electrode 42 was taken out. The negative electrode 42 thus taken out was washed with dimethyl carbonate (DMC), and then dried. From the dried negative electrode 42, the negative electrode current collector 42A in a region which was not coated with the negative electrode active material layer 42B was collected and a piercing test was then conducted with the collected current collector to determine the displacement amount D. Here, each of the inner diameters of the openings 51KA, 51KB in the pair of substrates 51A, 51B and the inner diameter (diameter) of the ring 54 was set to 11.3 mmφ (see FIGS. 3A to 3C). The piercing jig 53 made of stainless steel and having a 2.0 mmφ diameter hemispherical tip end portion 53T was brought into contact with the negative electrode current collector 42A that was clamped between the pair of substrates 51A and 51B under a pressure of 1 MPa. At this time, the piercing speed V was set to two levels of 0.025 mm/min and 50 mm/min, and the displacement amount D at each level was determined. The results are shown in Table 3.

TABLE 3

| | Thickness of negative electrode current collector: 12[μm] | | | | | | |
|---|---|---|---|---|---|---|---|
| | Negative electrode active material | | | Displacement D [mm] (Relative value [—]) | | | |
| | Content of SiO [%] | Volume density [g/cm3] | Expansion coefficient X [%] | D1 50 mm/min | D2 0.025 mm/min | Conditional formula (7) | Breaking after cycle test |
| Experimental Example 9 | 10.0 | 1.460 | 115.6 | 1.029 (1.000) | 0.997 (0.968) | 0.728 | Not broken |

TABLE 3-continued

Thickness of negative electrode current collector: 12[μm]

| | Negative electrode active material | | | Displacement D [mm] (Relative value [—]) | | | |
|---|---|---|---|---|---|---|---|
| | Content of SiO [%] | Volume density [g/cm3] | Expansion coefficient X [%] | D1 50 mm/min | D2 0.025 mm/mm | Conditional formula (7) | Breaking after cycle test |
| Experimental Example 10 | 8.6 | 1.541 | 115.8 | 0.670 (1.000) | 0.824 (1.230) | 0.772 | Not broken |
| Experimental Example 11 | 10.0 | 1.530 | 116.2 | 1.235 (1.000) | 1.238 (1.002) | 0.859 | Not broken |
| Experimental Example 12 | 11.6 | 1.530 | 116.7 | 1.190 (1.000) | 1.186 (0.997) | 0.969 | Not broken |
| Experimental Example 13 | 12.6 | 1.540 | 117.0 | 1.226 (1.000) | 1.224 (0.998) | 1.035 | Not broken |
| Experimental Example 14 | 15.6 | 1.536 | 118.0 | 1.390 (1.000) | 1.400 (1.007) | 1.254 | Not broken |
| Experimental Example 15 | 8.0 | 1.530 | 115.6 | 0.586 (1.000) | 0.720 (1.230) | 0.728 | Broken |
| Experimental Example 16 | 10.0 | 1.460 | 115.6 | 0.492 (1.000) | 0.473 (0.960) | 0.728 | Broken |
| Experimental Example 17 | 10.0 | 1.530 | 116.2 | 0.524 (1.000) | 0.507 (0.968) | 0.859 | Broken |
| Experimental Example 18 | 8.6 | 1.530 | 116.2 | 0.614 (1.000) | 0.619 (1.009) | 0.859 | Broken |
| Experimental Example 19 | 15.6 | 1.536 | 118.0 | 1.255 (1.000) | 1.253 (0.998) | 1.254 | Broken |

The piercing test was conducted as shown in FIGS. 3A to 3C to determine the displacement amount D. That is, as shown in FIG. 3A, a sample of the negative electrode current collector 42A was sandwiched between the pair of substrates 51A and 51B having openings 51KA, 51KB. Thereafter, in the negative electrode current collector 42A, the piercing jig 53 was brought closer to the portion where the openings 51KA and 51KB were overlapped at a constant piercing speed V, and was then traveled in the direction of the arrow Y53 so as to be orthogonal to the surface 42SS. After the tip end portion 53T of the piercing jig 53 was brought into contact with the surface 42SS (FIG. 3B), the piercing jig 53 was continuously traveled in the direction of the arrow Y53 at a constant piercing speed V until the sample of the negative electrode current collector 42A was broken (FIG. 3C). Thus, the displacement amount D of the tip end portion 53T in the direction of the arrow Y53 was determined from the time when the tip end portion 53T of the piercing jig 53 was brought into contact with the surface 42SS until the time when the sample of the negative electrode current collector 42A was broken. Table 3 shows numerical values obtained by standardizing the numerical value to 1 when the piercing speed V was 50 mm/min.

Figure 12:
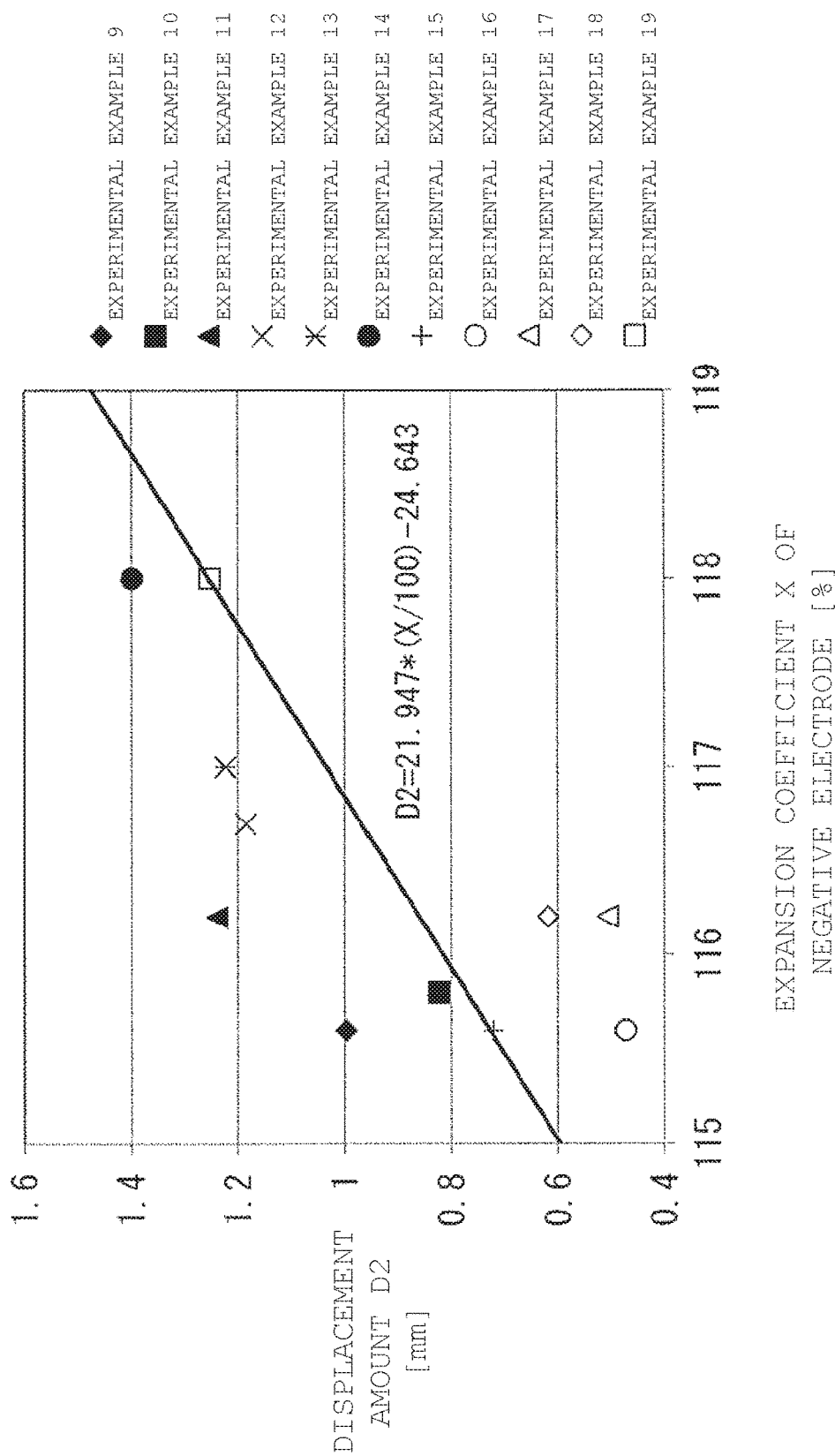
FIG. 12 illustrates other characteristics showing the results of the piercing test in the Experimental Examples according to an embodiment of the present technology.

The expansion coefficient X [%] of the negative electrode 42 of the secondary battery thus obtained in Example 9 was measured as follows. Specifically, the secondary battery in Example 9 in which constant current and constant voltage charge was conducted under conditions of an ambient temperature of 23° C., a charge voltage of 4.20 V, a charge current of 3000 mA, and a charge time of 2.5 hours, and constant current discharge was then conducted under conditions of an ambient temperature of 23° C., a discharge current of 600 mA and a discharge cut voltage of 2 V was disassembled in a dry room, the negative electrode 42 was taken out, and the thickness T1 of the negative electrode 42 in a discharged state was measured. Subsequently, the secondary battery in Example 9 in which constant current and constant voltage charge was conducted under conditions of a charge voltage of 4.25 V, a charge current of 3000 mA, and a charge cut current of 500 mA was disassembled in a dry room, the negative electrode 42 was taken out, and the thickness T2 of the negative electrode 42 in a charged state was measured. From the thicknesses T1 and T2 thus obtained, the expansion coefficient X (=T2/T1*100)[%] of the negative electrode 42 was calculated. The results are also shown in Table 3. The numerical values at the right side of the conditional formula (7) are shown together in Table 3. Further, FIG. 12 shows the relationship between the expansion coefficient X of the negative electrode 42 and the displacement amount D2. The line in FIG. 12 shows the following formula corresponding to the conditional formula (7): D2=21.947*(X/100)−24.643. As shown in Table 3 and FIG. 12, the displacement amount D2 at a piercing speed V of 0.025 mm/min resulted in satisfying the conditional formula (7).

Further, in the secondary battery in Example 9 thus obtained, constant current and constant voltage charge was conducted under conditions of an ambient temperature of 23° C., a charge voltage of 4.20 V, a charge current of 3000 mA, and a charge time of 2.5 hours, and constant current discharge was then conducted under conditions of a discharge current of 600 mA and a final voltage of 2.0 V, to thereby measure an initial capacity. The initial capacity was 3100 mAh. The alternating-current resistance of the secondary battery measured at a frequency of 1 kHz was 17.0 mΩ. Subsequently, further, a cycle in which constant current and constant voltage charge of the secondary battery was conducted under conditions of an ambient temperature of 0° C., a charge voltage of 4.25 V, a charge current of 4000 mA, and a charge time of 2 hours, and constant current discharge thereof was then conducted under conditions of a discharge current of 10000 mA and a final voltage of 2.0 V, was performed until the capacity retention rate falls below 30%. Thereafter, when the secondary battery was disassembled in a drying room and the negative electrode 42 was observed, breaking of the negative electrode current collector 42A was not confirmed. When the negative electrode current collector 42A was obtained from the disassembled secondary battery, the negative electrode 42 was washed with DMC to remove the negative electrode active material layer 42B.

EXPERIMENTAL EXAMPLE 10

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was not confirmed. In addition, as shown in Table 3 and FIG. 12, the results satisfied the conditional formula (7).

EXPERIMENTAL EXAMPLE 11

The same procedure as in the foregoing Experimental Example 9 was performed to fabricate the secondary battery and to evaluate it, except that the characteristic values of the displacement amount D of the negative electrode current collector 42A were different, and the volume density of the negative electrode active material was different. The results are shown together in Table 3. In this experimental example, breaking of the negative electrode current collector 42A was not confirmed. In addition, as shown in Table 3 and FIG. 12, the results satisfied the conditional formula (7).

EXPERIMENTAL EXAMPLE 12

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was not confirmed. In addition, as shown in Table 3 and FIG. 12, the results satisfied the conditional formula (7).

EXPERIMENTAL EXAMPLE 13

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was not confirmed. In addition, as shown in Table 3 and FIG. 12, the results satisfied the conditional formula (7).

EXPERIMENTAL EXAMPLE 14

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was not confirmed. In addition, as shown in Table 3 and FIG. 12, the results satisfied the conditional formula (7).

EXPERIMENTAL EXAMPLE 15

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was confirmed. In addition, as shown in Table 3 and FIG. 12, the results did not satisfy the conditional formula (7).

EXPERIMENTAL EXAMPLE 16

The same procedure as in the foregoing Experimental Example 9 was performed to fabricate the secondary battery and to evaluate it, except that the characteristic values of the displacement amount D of the negative electrode current collector 42A were different. The results are shown together in Table 3. In this experimental example, breaking of the negative electrode current collector 42A was confirmed. In addition, as shown in Table 3 and FIG. 12, the results did not satisfy the conditional formula (7).

EXPERIMENTAL EXAMPLE 17

The same procedure as in the foregoing Experimental Example 9 was performed to fabricate the secondary battery and to evaluate it, except that the characteristic values of the displacement amount D of the negative electrode current collector 42A were different, and the volume density of the negative electrode active material was different. The results are shown together in Table 3. In this experimental example, breaking of the negative electrode current collector 42A was confirmed. In addition, as shown in Table 3 and FIG. 12, the results did not satisfy the conditional formula (7).

EXPERIMENTAL EXAMPLE 18

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was confirmed. In addition, as shown in Table 3 and FIG. 12, the results did not satisfy the conditional formula (7).

EXPERIMENTAL EXAMPLE 19

The same procedure as in the foregoing Experimental Example 9 was performed to fabricate the secondary battery and to evaluate it, except that the content of silicon oxide (SiO) was different, the characteristic values of the displacement amount D of the negative electrode current collector 42A were different, and the volume density of the negative electrode active material was different. The results are shown together in Table 3. In this experimental example, breaking of the negative electrode current collector 42A was confirmed. In addition, as shown in Table 3 and FIG. 12, the results did not satisfy the conditional formula (7).

As shown in Table 3, it was confirmed that the negative electrode current collector 42A was less likely to be broken after the cycle test in the case where the ratio of the displacement amount D2 in the piercing test at a piercing speed V2 of less than 0.1 mm/min (where V2=0.025 mm/min) with respect to the displacement amount D1 in the piercing test at a piercing speed V1 of 0.1 mm/min or more (where V1=50 mm/min) was 0.968 or more and the negative electrode current collector 42A satisfied the conditional formula (7) (Experimental Examples 9 to 14).

Hereinbefore, the present technology is described with reference to one embodiment and the examples, but the present technology is not limited to one embodiment and the examples, and various modifications can be made.

For example, in order to explain the configuration of the secondary battery of the present technology, the case where the battery structure is a cylinder type and a laminated film type, and the case where the battery device has a winding structure are exemplified. However, the secondary battery of the present technology may be applied to the case where the secondary battery has another battery structure such as a coin type, a square type, and a button type, and the case where the battery device has another structure such as a laminated structure.

It should be understood that the effects described in the present specification are illustrative and not limiting, and other effects may be realized. The present technology is described below in further detail according to an embodiment.

<1>
A negative electrode for a lithium ion secondary battery having
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \tag{1}$$

$$D2 \geq 21.947*(X/100) - 24.643 \tag{2}$$

$$110 \leq X \leq 125 \tag{3}$$

where
D1: First displacement amount at a piercing speed of 0.1 mm/min or more in a piercing test
D2: Second displacement amount at a piercing speed of less than 0.1 mm/min in a piercing test
X: Expansion coefficient (%) of the negative electrode active material layer <2>
The negative electrode for a lithium ion secondary battery according to <1>, in which the negative electrode current collector is a copper alloy foil containing copper (Cu) as its main component.

<3>
The negative electrode for a lithium ion secondary battery according to <1> or <2>, in which the negative electrode active material layer includes at least one selected from the group consisting of an elementary substance of silicon (Si), a compound of Si, an elementary substance of tin (Sn), and a compound of Sn.

<4>
A lithium ion secondary battery including a positive electrode; a negative electrode; and an electrolyte,
in which the negative electrode has
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \tag{1}$$

$$D2 \geq 21.947*(X/100) - 24.643 \tag{2}$$

$$110 \leq X \leq 125 \tag{3}$$

where
D1: First displacement amount at a piercing speed of 0.1 mm/min or more in a piercing test
D2: Second displacement amount at a piercing speed of less than 0.1 mm/min in a piercing test
X: Expansion coefficient (%) of the negative electrode active material layer <5>
A battery pack, including:
a lithium ion secondary battery having a positive electrode, a negative electrode, and an electrolyte;
a controller for controlling an operation of the lithium ion secondary battery; and
a switch section for switching the operation of the lithium ion secondary battery in accordance with an instruction of the controller,
in which the negative electrode has
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \tag{1}$$

$$D2 \geq 21.947*(X/100) - 24.643 \tag{2}$$

$$110 \leq X \leq 125 \tag{3}$$

where
D1: First displacement amount at a piercing speed of 0.1 mm/min or more in a piercing test
D2: Second displacement amount at a piercing speed of less than 0.1 mm/min in a piercing test
X: Expansion coefficient (%) of the negative electrode active material layer <6>
An electric vehicle, including:
a lithium ion secondary battery having a positive electrode, a negative electrode, and an electrolyte;
a conversion section for converting electric power supplied from the lithium ion secondary battery into driving force,
a drive section for driving in accordance with the driving force, and
a controller for controlling an operation of the lithium ion secondary battery,
in which the negative electrode has
a negative electrode current collector satisfying all conditional formulas (1) to (3); and
a negative electrode active material layer provided on the negative electrode current collector.

(Note that the same conditions are used in piercing tests, except piercing speed.)

$$(D2/D1) \geq 0.968 \quad (1)$$

$$D2 \geq 21.947*(X/100) - 24.643 \quad (2)$$

$$110 \leq X \leq 125 \quad (3)$$

where

D1: First displacement amount at a piercing speed of 0.1 mm/min or more in a piercing test D2: Second displacement amount at a piercing speed of less than 0.1 mm/min in a piercing test X: Expansion coefficient (%) of the negative electrode active material layer

<7>

A power storage system, including:
a lithium ion secondary battery having a positive electrode, a negative electrode, and an electrolyte;
one or more kinds of electric devices having electric power supplied from the lithium ion secondary battery; and
a controller for controlling power supply from the lithium ion secondary battery to the one or more kinds of electric devices,
in which the negative electrode has
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \quad (1)$$

$$D2 \geq 21.947*(X/100) - 24.643 \quad (2)$$

$$110 \leq X \leq 125 \quad (3)$$

where

D1: First displacement amount at a piercing speed of 0.1 mm/min or more in a piercing test D2: Second displacement amount at a piercing speed of less than 0.1 mm/min in a piercing test X: Expansion coefficient (%) of the negative electrode active material layer

<8>

A power tool, including:
a lithium ion secondary battery having a positive electrode, a negative electrode, and an electrolyte; and
a movable section having electric power supplied from the lithium ion secondary battery,
in which the negative electrode has
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \quad (1)$$

$$D2 \geq 21.947*(X/100) - 24.643 \quad (2)$$

$$110 \leq X \leq 125 \quad (3)$$

where

D1: First displacement amount at a piercing speed of 0.1 mm/min or more in a piercing test D2: Second displacement amount at a piercing speed of less than 0.1 mm/min in a piercing test X: Expansion coefficient (%) of the negative electrode active material layer

<9>

An electronic device, including a lithium ion secondary battery having a positive electrode, a negative electrode, and an electrolyte as a power supply source,
in which the negative electrode has
a negative electrode current collector satisfying all conditional formulas (1) to (3); and
a negative electrode active material layer provided on the negative electrode current collector.
(Note that the same conditions are used in piercing tests, except piercing speed.)

$$(D2/D1) \geq 0.968 \quad (1)$$

$$D2 \geq 21.947*(X/100) - 24.643 \quad (2)$$

$$110 \leq X \leq 125 \quad (3)$$

where

D1: First displacement amount at a piercing speed of 0.1 mm/min or more in a piercing test D2: Second displacement amount at a piercing speed of less than 0.1 mm/min in a piercing test X: Expansion coefficient (%) of the negative electrode active material layer It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode for a lithium ion secondary battery, comprising:
a negative electrode current collector; and
a negative electrode active material layer provided on the negative electrode current collector,
wherein the negative electrode current collector is displaceable at a displacement amount that is characterized by a piercing test and satisfies:

$$(D2/D1) \geq 0.968 \quad (1),$$

$$D2 \geq 21.947*(X/100) - 24.643 \quad (2), \text{ and}$$

$$110 \leq X \leq 125 \quad (3),$$

wherein

D1 is a first displacement amount at a first piercing speed ranging from 0.1 mm/min to 50 mm/min in a first piercing test, D2 is a second displacement amount at a first piercing speed of 0.025 mm/min in a second piercing test, where D2 ranges from 0.59 mm to 1.40 mm, and X is an expansion coefficient (%) of the negative electrode active material layer, wherein same conditions are used in the first and second piercing tests except piercing speed, wherein the negative electrode current collector includes a conductive material including a metallic material selected from the group consisting of copper, aluminum, nickel, stainless steel, and an alloy thereof, wherein the negative electrode active material layer includes a negative electrode active material selected from the group consisting of an elementary substance of silicon, a compound of Si, an elementary substance of tin, a compound of tin, and combinations thereof, and wherein the negative electrode active material layer further includes a binder material including carboxymethyl cellulose and styrene-butadiene rubber.

2. The negative electrode according to claim 1, wherein the conductive material includes a copper foil.

3. The negative electrode according to claim 2, wherein the copper foil is a copper alloy foil including copper as a main component thereof.

4. The negative electrode according to claim 3, wherein the copper foil has a thickness ranging from 10 μm to 12 μm.

5. The negative electrode according to claim 1, wherein X is defined as:

$$115.6 \leq X \leq 118 \quad (3).$$

6. A lithium ion secondary battery comprising a positive electrode, a negative electrode, and an electrolyte,
wherein the negative electrode includes
a negative electrode current collector; and
a negative electrode active material layer provided on the negative electrode current collector,
wherein the negative electrode current collector is displaceable at a displacement amount that is characterized by a piercing test and satisfies:

$$(D2/D1) \geq 0.968 \quad (1),$$

$$D2 \geq 21.947*(X/100)-24.643 \quad (2), \text{ and}$$

$$110 \leq X \leq 125 \quad (3),$$

wherein

D1 is a first displacement amount at a first piercing speed ranging from 0.1 mm/min to 50 mm/min or more in a first piercing test, D2 is a second displacement amount at a second piercing speed of 0.025 mm/min in a second piercing test, where D2 ranges from 0.59 mm to 1.40 mm, and X is an expansion coefficient (%) of the negative electrode active material layer, wherein same conditions are used in the first and second piercing tests except piercing speed, wherein the negative electrode current collector includes a conductive material including a metallic material selected from the group consisting of copper, aluminum, nickel, stainless steel, and an alloy thereof, wherein the negative electrode active material layer includes a negative electrode active material selected from the group consisting of an elementary substance of silicon, a compound of Si, an elementary substance of tin, a compound of tin, and combinations thereof, and wherein the negative electrode active material layer further includes a binder material including carboxymethyl cellulose and styrene-butadiene rubber.

7. An electric vehicle, comprising:
the lithium ion secondary battery according to claim 4;
a converter configured to convert electric power supplied from the lithium ion secondary battery into driving force;
a driver configured to drive in accordance with the driving force; and a controller configured to control an operation of the lithium ion secondary battery.

8. A power storage system, comprising:
the lithium ion secondary battery according to claim 4;
an electric device configured to receive electric power supplied from the lithium ion secondary battery; and
a controller configured to control power supply from the lithium ion secondary battery to the electric device.

9. A power tool, comprising:
the lithium ion secondary battery according to claim 4; and
a movable section configured to receive electric power supplied from the lithium ion secondary battery.

10. An electronic device, comprising the lithium ion secondary battery according to claim 4.

11. A battery pack, comprising:
a lithium ion secondary battery including a positive electrode, a negative electrode, and an electrolyte;
a controller configured to control an operation of the lithium ion secondary battery; and
a switch configured to switch the operation of the lithium ion secondary battery in accordance with an instruction of the controller,
wherein the negative electrode includes
a negative electrode current collector; and
a negative electrode active material layer provided on the negative electrode current collector,
wherein the negative electrode current collector is displaceable at a displacement amount that is characterized by a piercing test and satisfies:

$$(D2/D1) \geq 0.968 \quad (1),$$

$$D2 \geq 21.947*(X/100)-24.643 \quad (2), \text{ and}$$

$$110 \leq X \leq 125 \quad (3),$$

wherein

D1 is a first displacement amount at a first piercing speed ranging from 0.1 mm/min to 50 mm/min in a first piercing test, D2 is a second displacement amount at a second piercing speed of 0.025 mm/min in a second piercing test, where D2 ranges from 0.59 mm to 1.40 mm, and X is an expansion coefficient (%) of the negative electrode active material layer, wherein same conditions are used in the first and second piercing tests except piercing speed, wherein the negative electrode current collector includes a conductive material including a metallic material selected from the group consisting of copper, aluminum, nickel, stainless steel, and an alloy thereof, wherein the negative electrode active material layer includes a negative electrode active material selected from the group consisting of an elementary substance of silicon, a compound of Si, an elementary substance of tin, a compound of tin, and combinations thereof, and wherein the negative electrode active material layer further includes a binder material including carboxymethyl cellulose and styrene-butadiene rubber.

* * * * *